United States Patent
Yamamoto et al.

(10) Patent No.: US 9,341,345 B2
(45) Date of Patent: May 17, 2016

(54) LIGHT DIFFUSION MEMBER, METHOD OF MANUFACTURING SAME, AND DISPLAY DEVICE

(75) Inventors: Emi Yamamoto, Osaka (JP); Toru Kanno, Osaka (JP); Tsuyoshi Maeda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 173 days.

(21) Appl. No.: 14/001,736

(22) PCT Filed: Mar. 1, 2012

(86) PCT No.: PCT/JP2012/055185
§ 371 (c)(1),
(2), (4) Date: Aug. 27, 2013

(87) PCT Pub. No.: WO2012/118137
PCT Pub. Date: Sep. 7, 2012

(65) Prior Publication Data
US 2013/0329401 A1  Dec. 12, 2013

(30) Foreign Application Priority Data
Mar. 3, 2011 (JP) .................. 2011-046262

(51) Int. Cl.
*G02F 1/1335* (2006.01)
*F21V 13/12* (2006.01)
(Continued)

(52) U.S. Cl.
CPC .............. *F21V 13/12* (2013.01); *F21V 13/02* (2013.01); *G02B 5/0247* (2013.01); *G02F 1/133504* (2013.01); *G02F 2001/133562* (2013.01)

(58) Field of Classification Search
CPC .................................................. G02F 1/133504
See application file for complete search history.

(56) References Cited

U.S. PATENT DOCUMENTS

| | | | |
|---|---|---|---|
| 6,417,966 B1 * | 7/2002 | Moshrefzadeh et al. | ..... 359/453 |
| 2002/0080484 A1 | 6/2002 | Moshrefzadeh et al. | |

(Continued)

FOREIGN PATENT DOCUMENTS

| | | |
|---|---|---|
| CN | 101236265 A | 8/2008 |
| CN | 202512257 U | 10/2012 |

(Continued)

OTHER PUBLICATIONS

Official Communication issued in International Patent Application No. PCT/JP2012/055185, mailed on Jun. 12, 2012.

*Primary Examiner* — Michael Caley
*Assistant Examiner* — Edmond Lau
(74) *Attorney, Agent, or Firm* — Keating & Bennett, LLP

(57) ABSTRACT

A light diffusion member includes a light-transmissive base, a plurality of light diffusion portions, a connecting portion, and a light absorbing layer. The light diffusion portions are arranged on one surface of the base and have light-incident end surfaces each positioned on the side away from the base and having a larger area than a light-emergent end surface thereof. The connecting portion connects at least two adjacent ones of the plural light diffusion portions to each other, and is positioned near the light-incident end surfaces of the adjacent light diffusion portions. The light absorbing layer is formed on the one surface of the base in a region different from a region where the light diffusion portions are formed. A size from the light-incident end surface to the light-emergent end surface of the light diffusion portion is larger than a thickness of the light absorbing layer.

1 Claim, 20 Drawing Sheets

(51) Int. Cl.
*F21V 13/02* (2006.01)
*G02B 5/02* (2006.01)

(56) References Cited

U.S. PATENT DOCUMENTS

2002/0167725 A1* 11/2002 Goto .............................. 359/456
2007/0019132 A1* 1/2007 Kim et al. ....................... 349/95
2007/0279551 A1* 12/2007 Umebayashi ........ G02B 6/0053
349/65
2008/0137367 A1 6/2008 Kim et al.
2009/0025726 A1* 1/2009 Maybaum ................ 128/205.11
2009/0091824 A1* 4/2009 Yamashita et al. ............ 359/453
2013/0329401 A1 12/2013 Yamamoto et al.

FOREIGN PATENT DOCUMENTS

| JP | 2000-352608 A | 12/2000 |
| JP | 2003-504691 A | 2/2003 |
| JP | 2004-516525 A | 6/2004 |
| JP | 3702328 B2 | 10/2005 |
| JP | 2010-079292 A | 4/2010 |

* cited by examiner

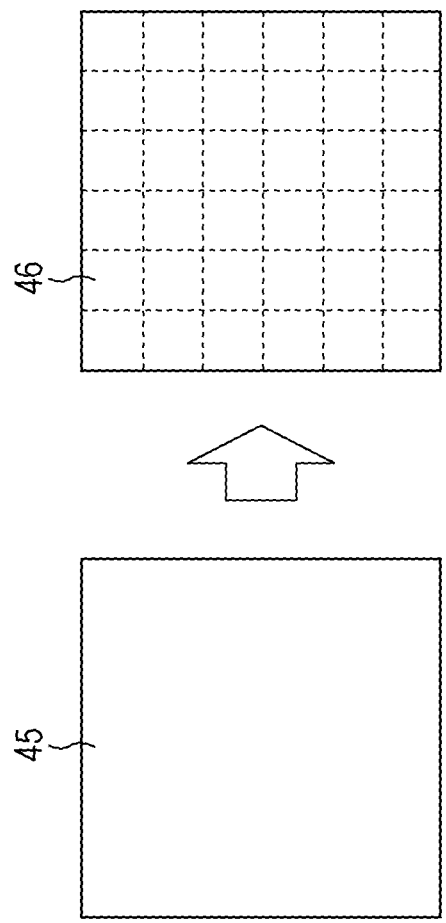

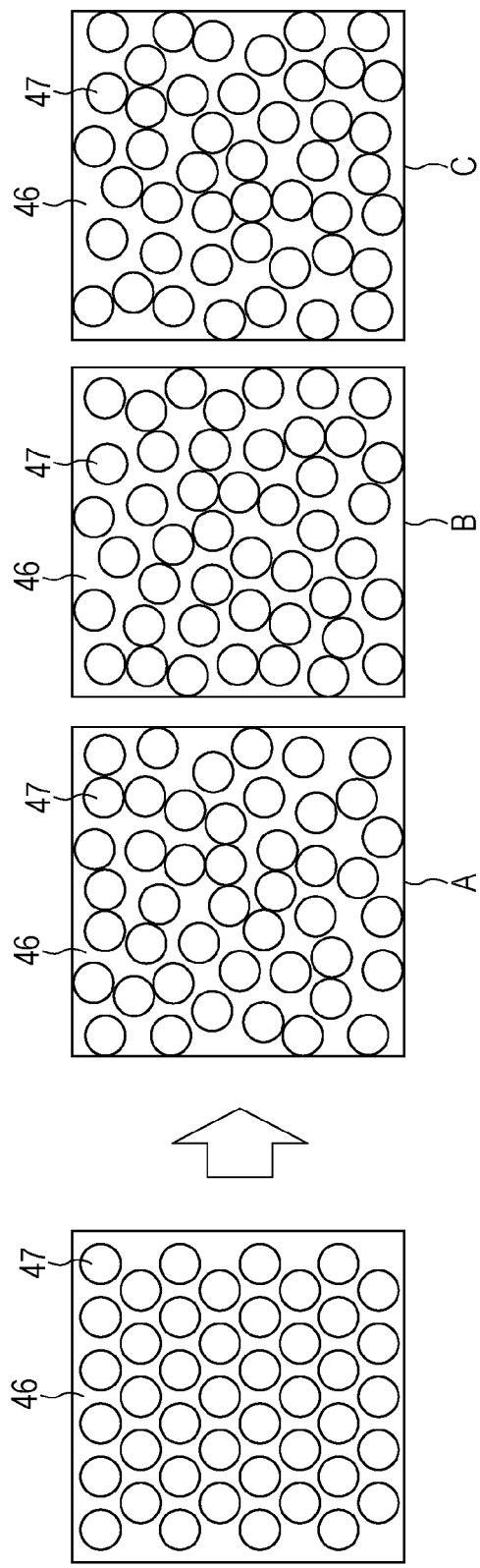

LIGHT DIFFUSION MEMBER, METHOD OF MANUFACTURING SAME, AND DISPLAY DEVICE

TECHNICAL FIELD

The present invention relates to a light diffusion member, a method of manufacturing the same, and a display device.

The present application claims priority on the basis of Japanese Patent Application No. 2011-046262, filed in the Japan Patent Office on Mar. 3, 2011, the entire contents of which are incorporated herein by reference.

BACKGROUND ART

Liquid crystal display devices are widely used as displays of portable electronic devices including cellular phones, or of televisions, personal computers, and so on. However, it is generally known so far that a liquid crystal display device has good viewability when looked from the front side, but its viewing angle is narrow. For that reason, various ideas have been proposed to widen the viewing angle. One of those ideas is to dispose a member (hereinafter referred to as a "light diffusion member") for diffusing light emerging from a display main unit, including a liquid crystal panel, etc., on the viewing side of the display main unit.

For example, Patent Literature (PTL) 1, given below, discloses a light diffusion sheet including a light diffusion layer for diffusing light that is going to transmit through the sheet in the direction of thickness thereof. The disclosed light diffusion sheet includes a plurality of grooves formed to extend in parallel in a one-dimensional direction and having a substantially V-shaped cross-section, and a substance in the form of a black liquid or solid, the substance being filled in the grooves and having a lower refractive index than that of the light diffusion layer. The grooves are formed such that each groove is flared in the V-like shape toward an observing-side surface of the light diffusion sheet and a tip end of the V-shape is positioned in the light diffusion layer.

CITATION LIST

Patent Literature

PTL 1: Japanese Patent No. 3702328

SUMMARY OF INVENTION

Technical Problem

With the light diffusion sheet disclosed in PTL 1, because the grooves are formed to extend in parallel in a one-dimensional direction, light is diffused only in the one-dimensional direction. Furthermore, because the light diffusion layer has a regular structure, a moiré is generated due to light interference and display quality is reduced when an image is displayed.

An object of embodiments of the present invention is to provide a light diffusion member and a method of manufacturing the same, which can widen a viewing angle by making light diffused in various directions, and to provide a display device including the light diffusion member and having good display quality.

Solution to Problem

To achieve the above object, according to one aspect of the present invention, there is provided a light diffusion member comprising a light-transmissive base, a plurality of light diffusion portions arranged on one surface of the base, the light diffusion portions each having a light-emergent end surface positioned on a side close to the base, and a light-incident end surface positioned on a side away from the base and having a larger area than the light-emergent end surface, at least one connecting portion connecting at least part of adjacent ones of the plural light diffusion portions to each other, the connecting portion being positioned near the light-incident end surfaces of the adjacent light diffusion portions, and a light absorbing layer formed on the one surface of the base in a region different from a region where the light diffusion portions are formed, wherein a size from the light-incident end surface to the light-emergent end surface of the light diffusion portion is larger than a thickness of the light absorbing layer.

In the light diffusion member according to the one aspect of the present invention, a total area of the coupling portions may be not less than 30% of a total area of the light-incident end surfaces of the light diffusion portions.

In the light diffusion member according to the one aspect of the present invention, the light diffusion portions may be aperiodically arranged when looked from a direction normal to the one surface of the base.

In the light diffusion member according to the one aspect of the present invention, the light diffusion portions may be arranged such that air exists in gaps between the light diffusion portions.

In the light diffusion member according to the one aspect of the present invention, a size of the light-emergent end surface of at least one of the plural light diffusion portions may be different from a size of the light-emergent end surfaces of the other light diffusion portions.

In the light diffusion member according to the one aspect of the present invention, an inclination angle of a lateral surface of at least one of the plural light diffusion portions may be different from an inclination angle of lateral surfaces of the other light diffusion portions.

In the light diffusion member according to the one aspect of the present invention, an inclination angle of a lateral surface of at least one of the plural light diffusion portions may be different depending on positions.

In the light diffusion member according to the one aspect of the present invention, a shape of the light diffusion portion in a plan view may be substantially circular or substantially polygonal when looked from a direction normal to the one surface of the base.

The light diffusion member according to the one aspect of the present invention may further comprise at least one of an antireflection layer, a polarizing filter layer, an antistatic layer, an anti-glaring processed layer, and an antifouling processed layer, which is disposed on an opposite surface of the base to the one surface thereof.

According to another aspect of the present invention, there is provided a method of manufacturing a light diffusion member, the method comprising the steps of forming a light absorbing layer, which has openings, on one surface of a light-transmissive base, forming a negative photosensitive resin layer, which is light-transmissive, on the one surface of the base in covering relation to the light absorbing layer, applying diffused light to the negative photosensitive resin layer through the openings in the light absorbing layer from an opposite surface of the base to the one surface thereof on which the light absorbing layer and the negative photosensitive resin layer are formed, and developing the negative photosensitive resin layer after being irradiated with the diffused light, thereby forming, on the one surface of the base, a plurality of light diffusion portions each having a light-emergent end surface positioned on a side close to the base, and a light-incident end surface positioned on a side away from the base and having a larger area than the light-emergent end surface, the light diffusion portions being in a state that at least part of adjacent ones of the light diffusion portions are coupled to each other in at least part of regions thereof on a same side as the light-incident end surfaces.

According to still another aspect of the present invention, there is provided a display device comprising a display main unit, and a viewing-angle widening member disposed on a viewing side and causing incident light from the display main unit to emerge therefrom in a state having a wider angle distribution than the light before entering the viewing-angle widening member, wherein the viewing-angle widening member includes the above-mentioned light diffusion member.

According to the still other aspect of the present invention, the display device may further comprise an adhesive layer between the light diffusion member and a viewing side of the display main unit, wherein the coupling portion may be contacted with the adhesive layer, and the adhesive layer may be arranged such that the adhesive layer and air exist in gaps between the light diffusion portions.

According to the still other aspect of the present invention, the display main unit may include a plurality of pixels forming a displayed image, and an average pitch between adjacent ones of the plural light diffusion portions of the light diffusion member may be smaller than a pitch between the pixels of the display main unit.

According to the still other aspect of the present invention, the display device may further comprise an information input device on a viewing side of the viewing-angle widening member.

According to the still other aspect of the present invention, the display main unit may include a light source and a light modulation element for modulating light emitted from the light source, and the light source may emit directional light.

According to the still other aspect of the present invention, the display main unit may be a liquid crystal display element.

Advantageous Effects of Invention

With the embodiments of the present invention, the light diffusion member and the method of manufacturing the same can be obtained which is able to widen the viewing angle by making light diffused in various directions. Furthermore, with the embodiments of the present invention, the display device can be obtained which includes the light diffusion member and has good display quality.

BRIEF DESCRIPTION OF DRAWINGS

FIG. 8A is an illustration to explain arrangement of the light diffusion portions in the viewing-angle widening film according to the first embodiment of the present invention.

FIG. 8B is an illustration to explain the arrangement of the light diffusion portions in the viewing-angle widening film according to the first embodiment of the present invention.

DESCRIPTION OF EMBODIMENTS

[First Embodiment]

A first embodiment of the present invention will be described below with reference to FIGS. 1A to 13.

The first embodiment is described in connection with an example of a liquid crystal display device that includes a transmission type liquid crystal panel as a display main unit.

It is to be noted that, in all of the drawings referred to in the following, dimension scales may be set different depending on constituent elements for easier understanding of the constituent elements in appearance.

Figure 1A:
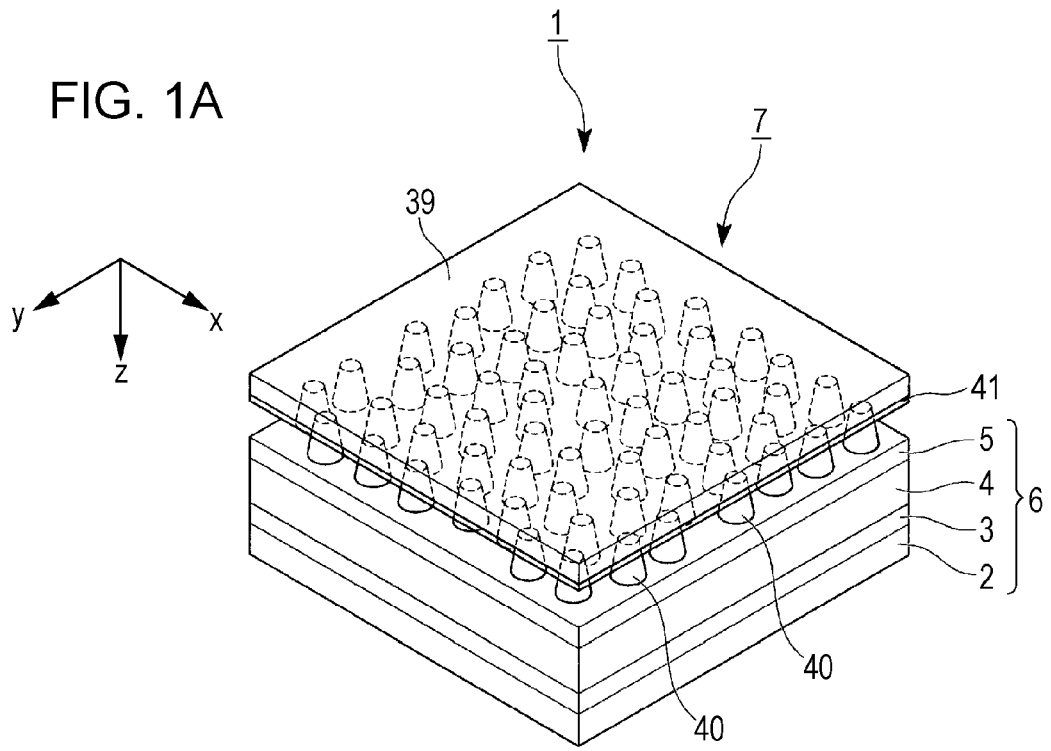
FIG. 1A is a perspective view of a liquid crystal display device according to a first embodiment of the present invention.
Figure 1B:
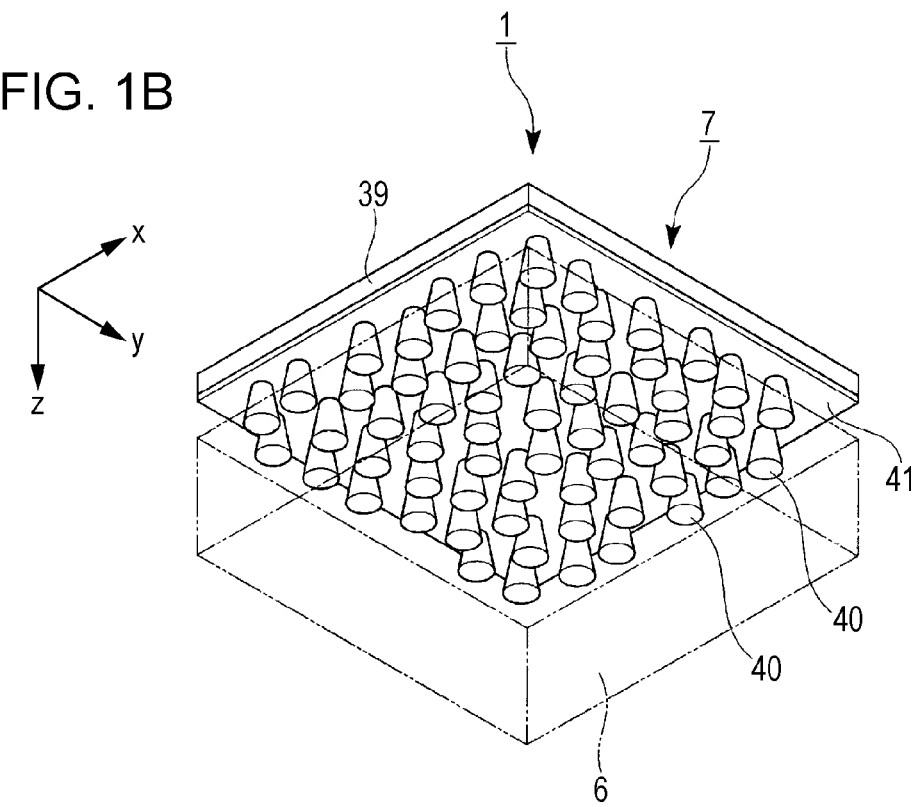
FIG. 1B is a perspective view of the liquid crystal display device according to the first embodiment of the present invention.
Figure 2:
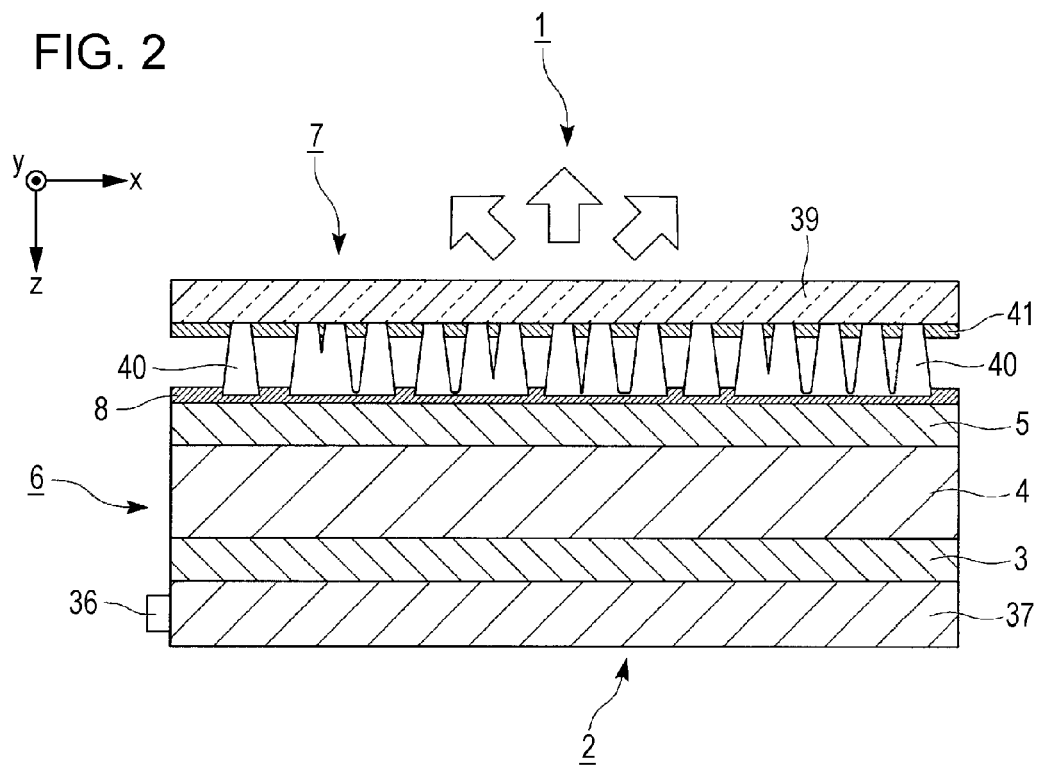
FIG. 2 is a sectional view of the liquid crystal display device according to the first embodiment of the present invention.

FIG. 1A is a perspective view of the liquid crystal display device according to the first embodiment when looked from a point obliquely upward away from the liquid crystal display device (i.e., from the viewing side). FIG. 1B is a perspective view of the liquid crystal display device according to the first embodiment when looked from a point obliquely downward away from the liquid crystal display device (i.e., from the rear surface side). FIG. 2 is a vertical sectional view of the liquid crystal display device according to the first embodiment.

A liquid crystal display device 1 (display device) according to the first embodiment is constituted, as illustrated in FIGS. 1A, 1B and 2, by a liquid-crystal display main unit 6 (display main unit) that includes a backlight 2 (light source), a first polarizing plate 3, a liquid crystal panel 4, and a second polarizing plate 5, and by a viewing-angle widening film 7 (viewing-angle widening member or light diffusion member). While, in FIGS. 1A and 2, the liquid crystal panel 4 is schematically illustrated in the form of one plate, the detailed structure of the liquid crystal panel 4 will be described later. An observer views displayed matters from the upper side of the liquid crystal display device 1, in FIG. 2, where the viewing-angle widening film 7 is arranged. In the following description, therefore, the side where the viewing-angle widening film 7 is arranged is called the viewing side, and the side where the backlight 2 is arranged is called the rear side.

In the liquid crystal display device 1 according to the first embodiment, light emitted from the backlight 2 is modulated by the liquid crystal panel 4, and predetermined images, characters, etc. are displayed with the modulated light. When the light having exited the liquid crystal panel 4 transmits through the viewing-angle widening film 7, the light emerges from the viewing-angle widening film 7 in a state having a wider angle distribution than the light before entering the viewing-angle widening film 7. Accordingly, the observer can view the displayed matters with a wider viewing angle.

The detailed structure of the liquid crystal panel 4 will be described below.

The following description is made in connection with an active matrix transmission type liquid crystal panel as one example. However, the liquid crystal panel applicable to the first embodiment is not limited to the active matrix transmission type liquid crystal panel. The liquid crystal panel applied to the first embodiment may be, e.g., a semi-transmissive (transflective) liquid crystal panel or a reflective liquid crystal display panel. Furthermore, the liquid crystal panel applied to the first embodiment may be a simple matrix liquid crystal panel without including a Thin Film Transistor (hereinafter abbreviated as a "TFT") for switching in each pixel.

Figure 3:
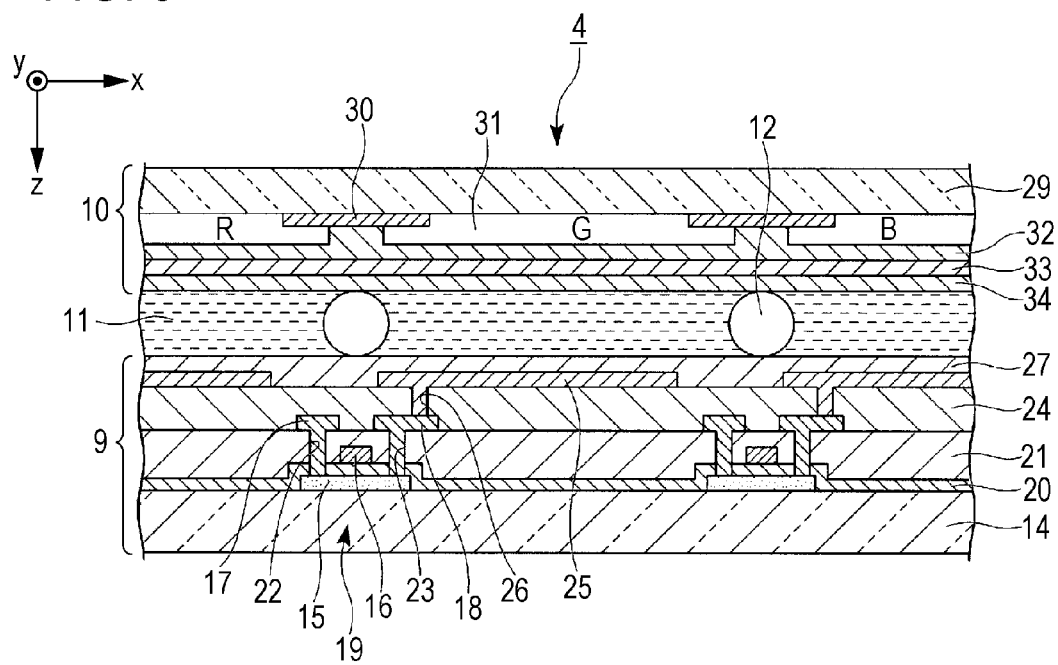
FIG. 3 is a sectional view of a liquid crystal panel in the liquid crystal display device according to the first embodiment of the present invention.

FIG. 3 is a vertical sectional view of the liquid crystal panel 4.

As illustrated in FIG. 3, the liquid crystal panel 4 includes a TFT substrate 9 serving as a switching element substrate, a color filter substrate 10 arranged opposite to the TFT substrate 9, and a liquid crystal layer 11 sandwiched between the TFT substrate 9 and the color filter substrate 10. The liquid crystal layer 11 is sealed off within a space that is surrounded by the TFT substrate 9, the color filter substrate 10, and a frame-like sealing member (not illustrated) for bonding the TFT substrate 9 and the color filter substrate 10 to each other with a predetermined spacing held therebetween. The liquid crystal panel 4 in the first embodiment performs a display operation in a VA (Vertical Alignment) mode, for example. A vertically-aligned liquid crystal having negative dielectric constant anisotropy is used as the liquid crystal layer 11. Spherical spacers 12 are arranged between the TFT substrate 9 and the color filter substrate 10 to hold constant the spacing between those two substrates. It is to be noted that the display mode is not limited to the above-mentioned VA mode, and a TN (Twisted Nematic) mode, an STN (Super Twisted Nematic) mode, an IPS (In-Plane Switching) mode, etc. may also be used.

A plurality of pixels (not illustrated), i.e., a minimum unit area for display, are arranged in a matrix pattern on the TFT substrate 9. Furthermore, on the TFT substrate 9, a plurality of source bus lines (not illustrated) are formed to extend in parallel to one another, and a plurality of gate bus lines (not illustrated) are formed to extend in parallel to one another in orthogonal relation to the source bus lines. Accordingly, on the TFT substrate 9, the source bus lines and the gate bus lines are formed in a grid pattern, and a rectangular area partitioned by the adjacent source bus lines and the adjacent gate bus lines serves as one pixel. The source bus lines are connected to source electrodes of later-described TFTs, and the gate bus lines are connected to gate electrodes of the TFTs.

A TFT 19 including a semiconductor layer 15, a gate electrode 16, a source electrode 17, a drain electrode 18, etc. is formed on a surface of a transparent substrate 14 constituting the TFT substrate 9, the surface being positioned closer to the liquid crystal layer 11. For example, a glass substrate can be used as the transparent substrate 14. The semiconductor layer 15 made of a semiconductor material, e.g., CGS (Continuous Grain Silicon), LPS (Low-temperature Poly-Silicon), or α-Si (Amorphous Silicon), is formed on the transparent substrate 14. Furthermore, a gate insulating film 20 is formed on the transparent substrate 14 to cover the semiconductor layer 15.

The gate insulating film 20 is made of, e.g., a silicon oxide film, a silicon nitride film, or a laminated film of those films.

The gate electrode 16 is formed on the gate insulating film 20 in opposed relation to the semiconductor layer 15. The gate electrode 16 is made of, e.g., a laminated film of W (tungsten)/ TaN (tantalum nitride), Mo (molybdenum), Ti (Titanium), or Al (aluminum).

A first interlayer insulating film 21 is formed on the gate insulating film 20 to cover the gate electrode 16. The first interlayer insulating film 21 is made of a silicon oxide film, a silicon nitride film, or a laminated film of those films. The source electrode 17 and the drain electrode 18 are formed on the first interlayer insulating film 21. The source electrode 17 is connected to a source region of the semiconductor layer 15 via a contact hole 22 penetrating through both the first interlayer insulating film 21 and the gate insulating film 20. Similarly, the drain electrode 18 is connected to a drain region of the semiconductor layer 15 via a contact hole 23 penetrating through both the first interlayer insulating film 21 and the gate insulating film 20. The source electrode 17 and the drain electrode 18 are each made of a conductive material similar to that of the above-mentioned gate electrode 16. A second interlayer insulating film 24 is formed on the first interlayer insulating film 21 to cover the source electrode 17 and the drain electrode 18. The second interlayer insulating film 24 is made of a material similar to that of the above-mentioned first interlayer insulating film 21, or of an organic insulating material.

A pixel electrode 25 is formed on the second interlayer insulating film 24. The pixel electrode 25 is connected to the drain electrode 18 via a contact hole 26 penetrating through the second interlayer insulating film 24. Thus, the pixel electrode 25 is connected to the drain region of the semiconductor layer 15 with the drain electrode 18 serving as a relay electrode. The pixel electrode 25 is made of a transparent conductive material, e.g., ITO (Indium Tin Oxide) or IZO (Indium Zinc Oxide). With such a structure, when a scan signal is supplied via the gate bus line and the TFT 19 is turned on, an image signal supplied to the source electrode 17 via the source bus line is supplied to the pixel electrode 25 via the semiconductor layer 15 and the drain electrode 18. In addition, an alignment film 27 is formed over an entire surface of the second interlayer insulating film 24 to cover the pixel electrode 25. The alignment film 27 has an alignment restriction force acting to vertically align liquid crystals constituting the liquid crystal layer 11. The TFT may be of a bottom gate type TFT illustrated in FIG. 3, or a top gate type TFT.

On the other hand, a black matrix 30, a color filter 31, a planarizing layer 32, a counter electrode 33, and an alignment film 34 are successively formed on a surface of a transparent substrate 29 constituting the color filter substrate 10, the surface being positioned closer to the liquid crystal layer 11. The black matrix 30 has the function of blocking off transmission of light in inter-pixel regions. The black matrix 30 is formed using metal, e.g., Cr (chromium) or in the form of a multilayered film of Cr/Cr oxide, or using a photoresist that is prepared by dispersing carbon particles in a photosensitive resin. The color filter 31 contains colorants in three colors, i.e., red (R), green (G), and (B). The color filter 31 in one of R, G and B is arranged opposite to one pixel electrode 25 on the TFT substrate 9. The planarizing layer 32 is made of an insulating film covering both the black matrix 30 and the color filter 31. The planarizing layer 32 has the function of reducing level differences generated due to the provision of the black matrix 30 and the color filter 31, and planarizing an exposed surface. The counter electrode 33 is formed over the planarizing layer 32. The counter electrode 33 is made of a transparent conductive material similar to that of the pixel electrode 25. Moreover, an alignment film 34 having a vertical alignment restriction force is formed over the entire counter electrode 33. The color filter 31 may contain colorants in colors more than three, i.e., R, G and B.

As illustrated in FIG. 2, the backlight 2 includes a light source 36, e.g., a light emitting diode or a cold cathode tube, and a light guide plate 37 for causing light emitted from the light source 36 to be guided toward the liquid crystal panel 4 through internal reflection of the light emitted from the light source 36. The backlight 2 may be of the edge-lighting type in which a light source is arranged at an end surface of a light guide member, or the direct-lighting type in which a light source is arranged right under a light guide member. The backlight 2 used in the first embodiment is preferably a backlight capable of controlling the outgoing direction of light and giving directionality to the light, i.e., the so-called directional backlight. It is possible to reduce a blur and to increase the usage efficiency of light by employing the directional backlight that makes collimated light or substantially collimated light incident on light diffusion portions of the viewing-angle widening film 7, described below. The directional backlight can be realized, for example, by optimizing the shape and the arrangement of a reflection pattern formed in the light guide plate 37. In addition, the first polarizing plate 3 functioning as a polarizer is disposed between the backlight 2 and the liquid crystal panel 4. The second polarizing plate 5 functioning as an analyzer is disposed between the liquid crystal panel 4 and the viewing-angle widening film 7.

The viewing-angle widening film 7 will be described in detail below.

Figure 4A:
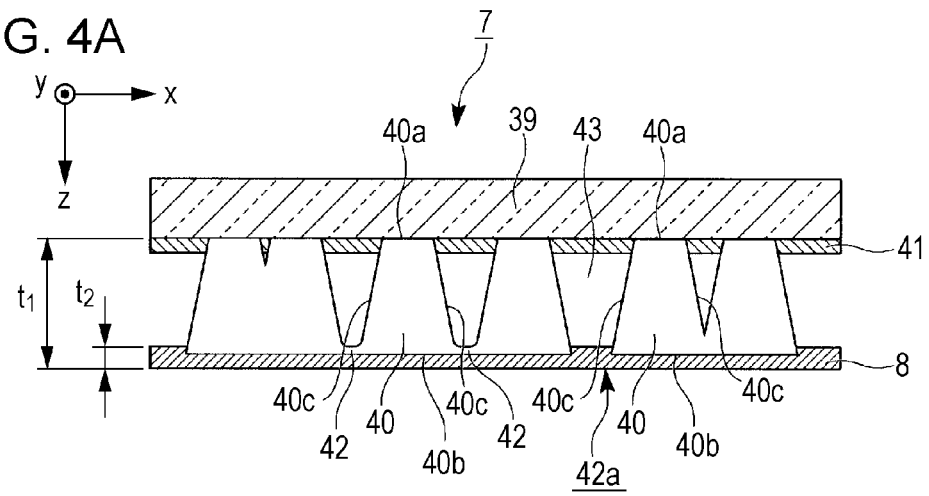
FIG. 4A is a sectional view of a viewing-angle widening film in the liquid crystal display device according to the first embodiment of the present invention.
Figure 4B:
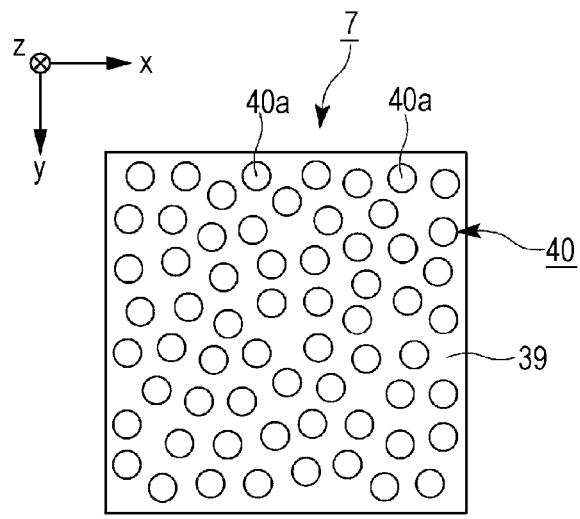
FIG. 4B is a plan view of the viewing-angle widening film in the liquid crystal display device according to the first embodiment of the present invention.
Figure 4C:
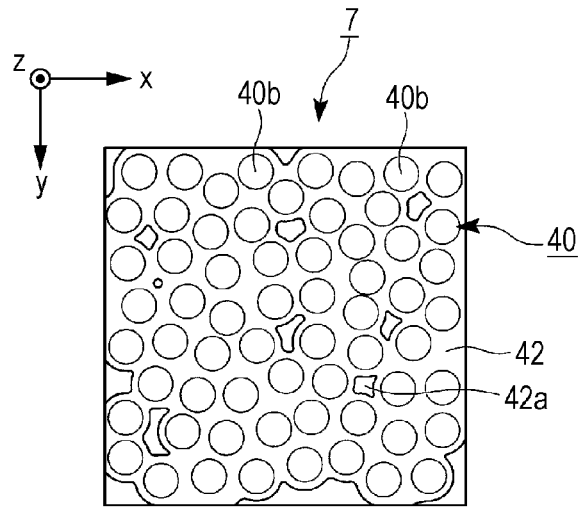
FIG. 4C is a plan view of the viewing-angle widening film in the liquid crystal display device according to the first embodiment of the present invention.

FIG. 4A is a vertical sectional view of the viewing-angle widening film 7. FIG. 4B is a plan view of the viewing-angle widening film 7 when looked from the viewing side. FIG. 4C is a plan view of the viewing-angle widening film 7 when looked from the rear side.

As illustrated in FIG. 4A, the viewing-angle widening film 7 includes a base 39, a plurality of light diffusion portions 40 formed on one surface (surface on the side oppositely away from the viewing side), and a black layer 41 (light absorbing layer) formed on the one surface of the base 39. The viewing-angle widening film 7 is, as illustrated in FIG. 2, arranged on the second polarizing plate 5 in such a posture that the side including the light diffusion portions 40 faces the second polarizing plate 5 and the side including the base 39 faces the viewing side. The viewing-angle widening film 7 is fixed to the liquid-crystal display main unit 6 with an adhesive layer 8 interposed between them.

The base 39 is preferably made of a transparent resin film, e.g., a film of triacetyl cellulose (TAC), polyethylene terephthalate (PET), polycarbonate (PC), polyethylene naphthalate (PEN), or polyethersulfone (PES). The base 39 serves as an underlying layer when materials of the black layer 41 and the light diffusion portions 40 are coated in a manufacturing process described later. The base 39 is hence required to have heat resistance and mechanical strength endurable against heat treatment steps executed in the manufacturing process. Accordingly, a glass-made base may also be used as the base 39 instead of a resin-made base. However, the thickness of the base 39 is preferably thin to such an extent that the heat resistance and the mechanical strength will not become insufficient. The reason is that a displayed image may be blurred with a higher possibility as the thickness of the base 39 increases. Furthermore, a total light transmissivity of the base 39 is preferably not less than 90% in conformity with the rule of JIS (Japan Industrial Standard) K7361-1. At the total light transmissivity being not less than 90%, sufficient transparency is obtained. In the first embodiment, a transparent resin-made base having a thickness of 100 μm is used as one example.

The light diffusion portions 40 are made of an organic material being transmissive and sensitive to light, e.g., an acrylic resin or an epoxy resin. A total light transmissivity of the light diffusion portions 40 is preferably not less than 90% in conformity with the rule of JIS K7361-1. At the total light transmissivity being not less than 90%, sufficient transparency is obtained. As illustrated in FIGS. 4B and 4C, the light diffusion portions 40 are each formed to have a circular shape in a horizontal section (xy-section) such that an area of a surface 40a positioned on the side closer to the base 39 and serving as a light-emergent end surface is relatively small, an area of a surface 40b positioned on the side farther away from the base 39 and serving as a light-incident end surface is relatively large, and the area of the horizontal section of each light diffusion portion gradually increases from the side closer to the base 39 toward the side farther away from the base 39. In other words, each light diffusion portion 40 has a shape of an inverted truncated cone, i.e., the so-called inversely tapered shape, when looked along the vertical direction from the side closer to the base 39.

The light diffusion portions 40 serve as portions contributing to transmission of light in the viewing-angle widening film 7. In more detail, light incident on each of the light diffusion portions 40 emerges therefrom after being guided in a state substantially enclosed inside the light diffusion portion 40 while the light is totally reflected at a tapered lateral surface 40c of the light diffusion portion 40. As illustrated in FIGS. 4B and 4C, the plural light diffusion portions 40 are arranged at random when looked from the direction normal to a principal surface of the base 39. It is to be noted that an x-axis is defined as the horizontal direction of a screen of the liquid crystal panel 4, a y-axis is defined as the vertical direction of the screen of the liquid crystal panel 4, and a z-axis is defined as the direction of thickness of the liquid crystal display device 1.

In the first embodiment, the light diffusion portions 40 are arranged in a state where the individual light diffusion portions 40 are not completely isolated from each other. As illustrated in FIGS. 4A and 4C, among the plural light diffusion portions 40, at least part of adjacent (at least two adjacent) light diffusion portions 40 are coupled to each other in at least part of regions thereof on the same side as the light-incident end surfaces 40b. The coupled light diffusion portions 40 and the uncoupled light diffusion portions 40 may be arranged at random. On an assumption that each light diffusion portion 40 basically has a circular shape in design, portions of the light diffusion portions 40 projecting outward of the circular shape and being coupled to each other are called "coupling portions 42" in the following description. A total area of the coupling portions 42, which couple the light diffusion portions 40 to each other, over the entire viewing-angle widening film 7 is desired to be not less than 30% and not more than 100% of a total area of the light-incident end surfaces 40b of the light diffusion portions 40. It is to be noted that, in FIGS. 1A and 1B, the coupling portions 42 are omitted for clarity of the drawings.

As illustrated in FIG. 4A, the black layer 41 is formed in regions of a surface of the base 39 on the side where the light diffusion portions 40 are formed, other than regions where the light diffusion portions 40 are formed. The black layer 41 is made of, as one example, an organic material being light-absorptive and photosensitive, e.g., a black resist. As another example, a metal film made of, e.g., Cr (chromium) or in the form of, e.g., a multilayered film of Cr/Cr oxide. The thickness of the black layer 41 is set to be smaller than the height of the light diffusion portion 40 from the light-incident end surface 40b to the light-emergent end surface 40a thereof. In the first embodiment, the thickness of the black layer 41 is about 150 nm, for example, and the height of the light diffusion portion 40 from the light-incident end surface 40b to the light-emergent end surface 40a thereof is about 25 μm, for example.

In gaps between the light diffusion portions 40, the black layer 41 exists in portions of the gaps, the portions contacting with the one surface of the base 39, and air 43 exists under the black layer 41. While the air 43 exists in the gaps between the light diffusion portions 40 under the black layer 41 in the first embodiment, another type of gas may exist there. That gas may be inert gas. In practice, that gas may be nitrogen or argon. In the viewing-angle widening film 7 according to the first embodiment, as illustrated in FIG. 4C, all the light diffusion portions 40 are not completely coupled to one another. At a position where a distance between the adjacent light diffusion portions 40 is relatively large, the light diffusion portions 40 are not coupled to each other, and an opening 42a exists. Accordingly, when the viewing-angle widening film 7 is bonded to the liquid-crystal display main unit 6, an adhesive enters the gaps between the light diffusion portions 40 through the openings 42a, whereby the adhesive layer 8 is formed on the same side as the light-incident end surface 40b. On that occasion, an amount of adhesive is adjusted such that the gaps between the light diffusion portions 40 are not fully filled with the adhesive layer 8, as illustrated in FIG. 4A. Stated in another way, assuming that the height of the light diffusion portions 40 is denoted by t1 and the thickness of the adhesive layer 8 is denoted by t2, t1/t2>1 is satisfied. As a result, the gaps between the light diffusion portions 40 are formed in such a state that the black layer 41 exists in the gap portions contacting with the one surface of the base 39, the adhesive layer 8 exists on the same side as the light-incident end surface 40b, and the air 43 exists between the black layer 41 and the adhesive layer 8.

The refractive index of the base 39 and the refractive index of each light diffusion portion 40 are desirably almost equal to each other. This is because, if the refractive index of the base 39 and the refractive index of each light diffusion portion 40 are different to a large extent, there is a possibility that when light incident on the light-incident end surface 40b emerges from the light diffusion portion 40, undesired refraction and reflection of the light may occur at the interface between the light diffusion portion 40 and the base 39. This may result in a risk, for example, that the desired viewing angle is not obtained and an amount of emergent light is reduced.

The viewing-angle widening film 7 is arranged with the base 39 facing the viewing side, as illustrated in FIG. 2. Of two opposite surfaces of the light diffusion portion 40 having the truncated conical shape, therefore, the surface having a smaller area serves as the light-emergent end surface 40a, and the surface having a larger area serves as the light-incident end surface 40b. Furthermore, an inclination angle of the lateral surface 40c of the light diffusion portion 40 (i.e., an angle formed by the light-emergent end surface 40a and the lateral surface 40c) is about 80°, for example. However, the inclination angle of the lateral surface 40c of the light diffusion portion 40 is not limited to a particular value insofar as the inclination angle is set to a value at which the incident light can be sufficiently diffused when emerging from the viewing-angle widening film 7.

Figure 5A:
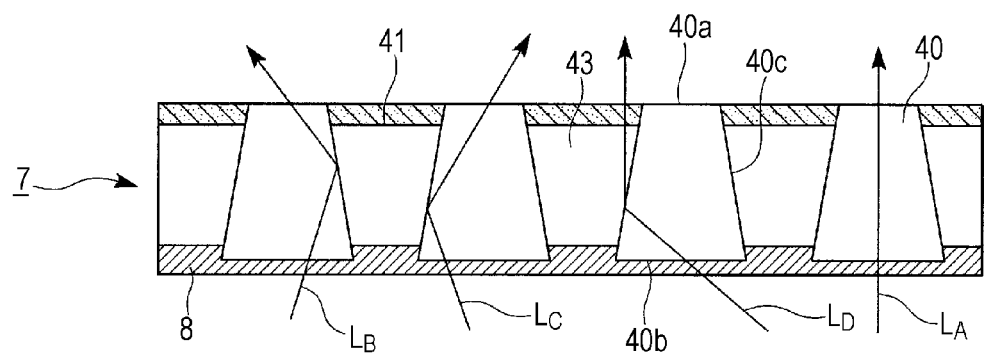
FIG. 5A is an illustration to explain reflection of light at a lateral surface of a light diffusion portion in the viewing-angle widening film according to the first embodiment of the present invention.
Figure 5B:
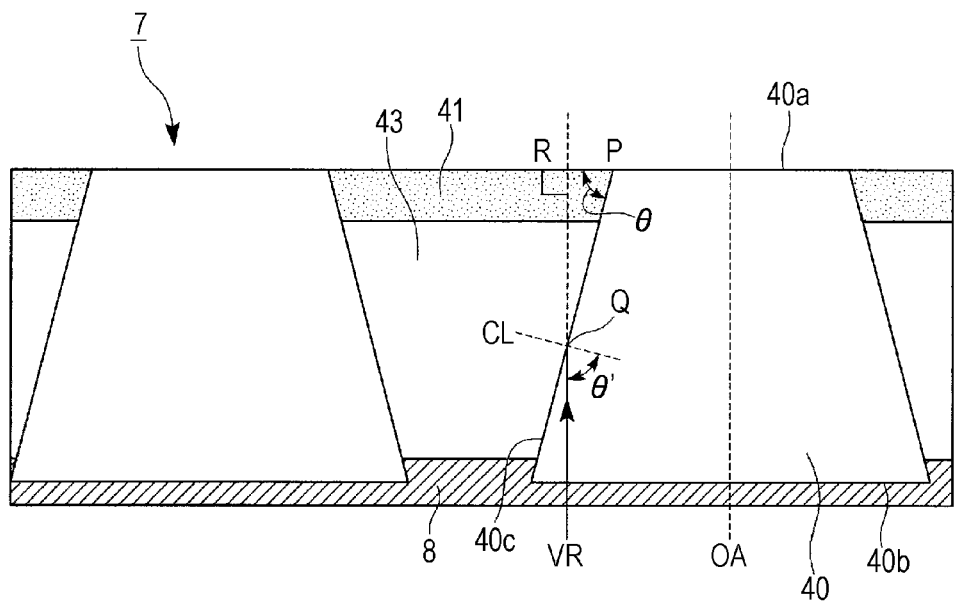
FIG. 5B is an illustration to explain reflection of light at the lateral surface of the light diffusion portion in the viewing-angle widening film according to the first embodiment of the present invention.

As illustrated in FIG. 5B, the angle formed by the lateral surface 40c of the light diffusion portion 40 and the light-emergent end surface 40a is set to an angle θ' (in unit of degree

[°]) larger than a critical angle with respect to a normal line CL to the lateral surface 40c of the light diffusion portion 40 in order that light incident parallel to or substantially parallel to an optical axis OA is totally reflected. Assuming that a point at which the lateral surface 40c of the light diffusion portion 40 intersects the light-emergent end surface 40a is denoted by a point P, a point at which incident light VR parallel to the optical axis OA enters the lateral surface 40c is denoted by a point Q, and a point at which a line being vertical to the light-emergent end surface 40a and passing the point Q intersects the light-emergent end surface 40a is denoted by a point R, the angle θ formed by the lateral surface 40c of the light diffusion portion 40 and the light-emergent end surface 40a perpendicular to the optical axis OA can be expressed by an angle QPR. On that occasion, because a value of an angle PQR is (90−θ)°, the inclination angle θ of the lateral surface 40c of the light diffusion portion 40 is the same as the incident angle θ' of the incident light VR at the point Q. Accordingly, the inclination angle θ of the lateral surface 40c of the light diffusion portion 40 is formed as angle larger than the above-mentioned critical angle.

In the first embodiment, because of the air 43 existing between the adjacent light diffusion portions 40, when the light diffusion portions 40 are each formed using a transparent acrylic resin, for example, the lateral surface 40c of the light diffusion portion 40 is given as an interface between the transparent acrylic resin and the air 43. Herein, even if the surroundings of the light diffusion portion 40 is filled with some other material having a low refractive index, a difference in refractive index at an interface between the inside and the outside of the light diffusion portion 40 is maximized when the air 43 exists in the outside, in comparison with the case where any other material having a low refractive index exists in the outside. With the first embodiment constituted as described above, therefore, the critical angle is minimized based on the Snell's law, and an incident angle range where the light is totally reflected at the lateral surface 40c of the light diffusion portion 40 is most widened. As a result, a loss of light is more effectively suppressed, and higher luminance can be obtained.

As denoted by arrows LB and LC in FIG. 5A, the incident light hitting on the lateral surface 40c at an angle, which is larger than the critical angle, is totally reflected at the lateral surface 40c and is output to the observer side after transmitting through the light diffusion portion 40. Furthermore, as denoted by an arrow LA in FIG. 5A, the incident light transmitting through the light diffusion portion 40 without hitting on the lateral surface 40c is output to the observer side as it is. On the other hand, as denoted by an arrow LD in FIG. 5A, the incident light hitting on the lateral surface 40c at an angle, which is not larger than the critical angle, is not totally reflected at the lateral surface 40c, and it passes across the lateral surface 40c of the light diffusion portion 40. In the first embodiment, since the black layer 41 is disposed in the regions other than the regions where the light diffusion portions 40 are formed, the light having passed across the lateral surface 40c of the light diffusion portion 40 is absorbed by the black layer 41. Accordingly, blurring of the displayed image and reduction of contrast can be avoided. However, if an amount of light passing across the lateral surface 40c of the light diffusion portion 40 increases, a loss of the light amount is caused and an image with high luminance is not obtained. In the liquid crystal display device 1 according to the first embodiment, therefore, it is preferable to employ a backlight emitting light at an angle at which the light will not hit on the lateral surface 40c of the light diffusion portion 40 at the critical angle or less, i.e., the so-called directional backlight.

A method of manufacturing the liquid crystal display device 1 having the above-described structure will be described below with reference to FIGS. 6 to 10B.

Manufacturing steps of the viewing-angle widening film 7 are primarily described below.

To briefly describe manufacturing steps of the liquid-crystal display main unit 6 prior to the description of the viewing-angle widening film 7, the TFT substrate 9 and the color filter substrate 10 are first fabricated separately. Thereafter, the surface of the TFT substrate 9 where the TFTs 19 are formed and the surface of the color filter substrate 10 where the color filter 31 is formed are arranged opposite to each other. The TFT substrate 9 and the color filter substrate 10 are then bonded to each other with a sealing member interposed between them. Thereafter, a liquid crystal is filled in a space surrounded by the TFT substrate 9, the color filter substrate 10, and the sealing member. The first polarizing plate 3 and the second polarizing plate 4 are then bonded respectively to both surfaces of the liquid crystal panel 4, constituted as described above, by employing an optical adhesive or the like. The liquid-crystal display main unit 6 is completed through the above-mentioned steps.

Since the TFT substrate 9 and the color filter substrate 10 can be manufactured using the known method, description of the method of manufacturing them is omitted.

Figure 6:
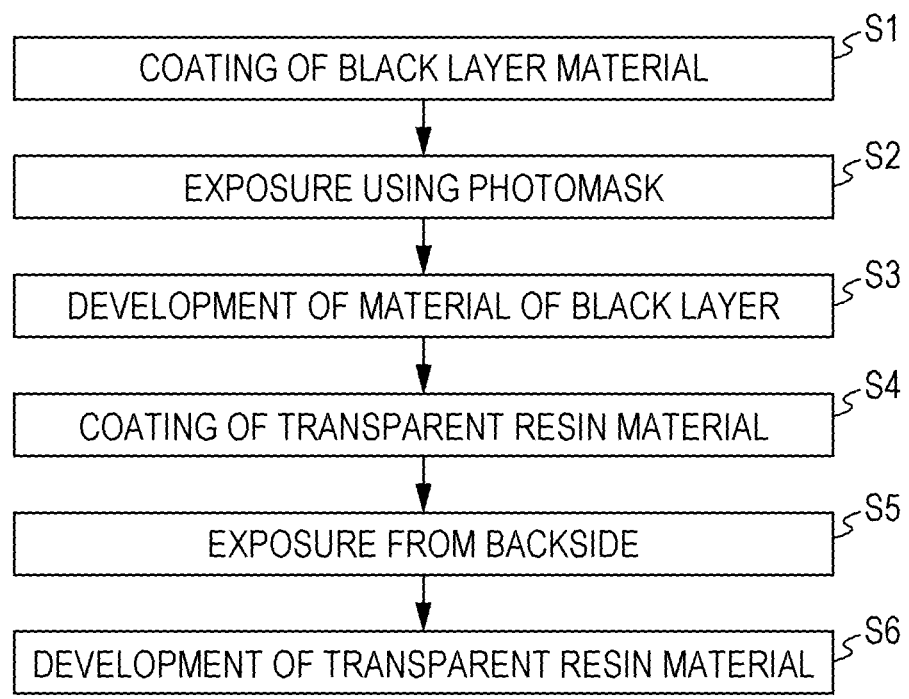
FIG. 6 is a flowchart illustrating steps of manufacturing the viewing-angle widening film according to the first embodiment of the present invention.
Figure 7A:
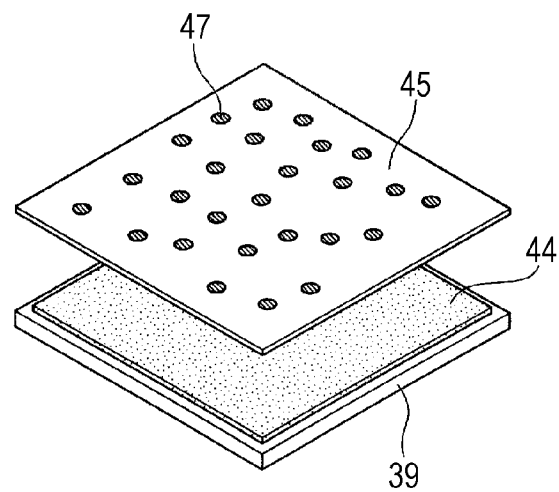
FIG. 7A is a perspective view illustrating a step of manufacturing the viewing-angle widening film according to the first embodiment of the present invention.

Initially, as illustrated in FIG. 7A, the base 39 made of triacetyl cellulose and having a size of 10-cm square and a thickness of 100 μm is prepared. A black negative resist containing carbon is coated as a black layer material over one surface of the base 39 by the spin coating method, whereby a coating film 44 with a thickness of 150 nm is formed (step S1 in FIG. 6).

Then, the base 39 including the coating film 44 formed thereon is placed on a hot plate, and the coating film 44 is subjected to pre-baking at a temperature of 90° C. With the pre-baking, a solvent in the black negative resist is volatilized.

By employing an exposure apparatus, the coating film 44 is then irradiated and exposed with light through a photomask 45 including a plurality of light blocking patterns 47 arranged at random (step S2 in FIG. 6). At that time, an exposure apparatus using a mixture of the i-line having a wavelength of 365 nm, the h-line having a wavelength of 404 nm, and the g-line having a wavelength of 436 nm is used. An exposure amount is set to 100 mJ/cm$^2$. In the first embodiment, since the light diffusion portions 40 are formed by exposing a transparent negative resist in a subsequent step with the black layer 41 used as a mask, positions of the light blocking patterns 47 in the photomask 45 correspond to positions where the light diffusion portions 40 are formed. The light blocking patterns 47 are all circular patterns having a diameter of 20 μm and are arranged at random. Therefore, spacings (pitches) between the adjacent light blocking patterns 47 are not constant, but an average pitch obtained by averaging the pitches between the adjacent light blocking patterns 47 is 25 μm. The average pitch of the light blocking patterns 47 is preferably smaller than a pixel spacing (pitch) of the liquid crystal panel 4. As a result, at least one light diffusion portion 40 is formed in one pixel. Hence the viewing angle can be widened, for example, when the viewing-angle widening film 7 is combined with a liquid crystal panel having a small pixel pitch, which is used in a mobile device and so on.

One example of a method for designing the photomask 45 including the plural light blocking patterns 47 arranged at random is described here.

First, as illustrated in FIG. 8A, the entire photomask 45 is divided into a number m×n (e.g., 36) of regions 46, which are constituted by a number m (e.g., 6) of regions in the vertical direction and a number n (e.g., 6) of regions in the horizontal direction.

Then, as illustrated in FIG. 8B, a pattern including circles, which correspond to respective shapes of the light blocking patterns 47 and which are close-packed, is formed in one of the regions 46 divided in the preceding step (see the leftmost drawing in FIG. 8B). Then, plural types (e.g., three patterns A, B and C) of position data are prepared by adding fluctuations to position data, which serves as the basis for positions of the individual circles and which is provided by, e.g., center coordinates of the individual circles, by employing a random function (see three drawings on the right side in FIG. 8B).

Figure 8C:
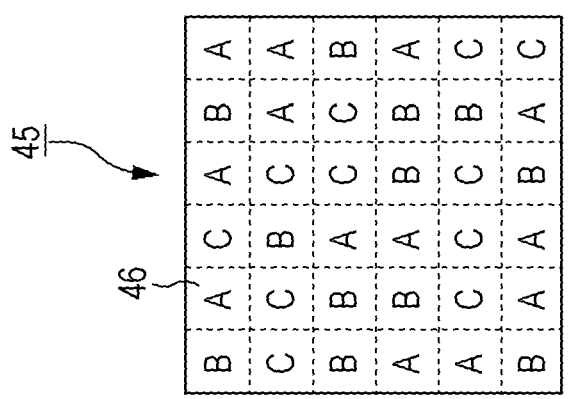
FIG. 8C is an illustration to explain the arrangement of the light diffusion portions in the viewing-angle widening film according to the first embodiment of the present invention.

Then, as illustrated in FIG. 8C, the plural types of position data A, B and C prepared in the preceding step are assigned to the number (m×n) of regions at random. For example, the position data A, B and C are assigned to the regions 46 such that the position data A, the position data B, and the position data C appear in the thirty-six (36) regions 46 at random. Thus, looking at the photomask 45 for each of the regions 46, the light blocking patterns 47 in each region 46 are arranged corresponding to any one of the position data A, the position data B, and the position data C. In other words, all the light blocking patterns 47 are not arranged at random over all the regions. However, the plural light blocking patterns 47 are arranged at random when looking at the entirety of the photomask 45.

Figure 7B:
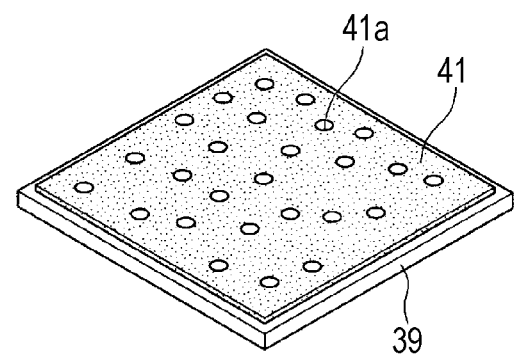
FIG. 7B is a perspective view illustrating a step of manufacturing the viewing-angle widening film according to the first embodiment of the present invention.

After exposing the coating film 44 using the photomask 45, the coating film 44 made of the black negative resist is developed using a dedicated developing solution. The developed coating film 44 is then dried at 100° C., whereby the black layer 41 including a plurality of circular openings 41a is formed on the one surface of the base 39, as illustrated in FIG. 7B (step S3 in FIG. 6). The circular openings 41a correspond to the regions where the light diffusion portions 40 are formed in a subsequent step. While, in the first embodiment, the black layer 41 is formed by photolithography using the black negative resist, a positive resist can also be used by employing, instead of the above-described photomask, a photomask in which light-transmissive portions are reversed to the light blocking patterns 47 in the first embodiment. As an alternative, the black layer 41 may be formed, for example, by the vapor deposition method or the printing method.

Figure 7C:
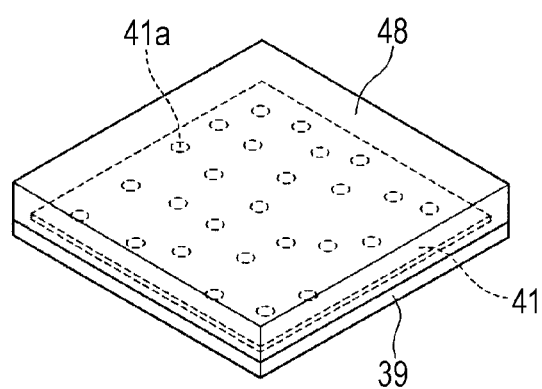
FIG. 7C is a perspective view illustrating a step of manufacturing the viewing-angle widening film according to the first embodiment of the present invention.

Then, as illustrated in FIG. 7C, a transparent negative resist made of an acrylic resin is coated, as a material of the light diffusion portions, over an upper surface of the black layer 41 by employing the spin coating method, whereby a coating film 48 with a thickness of 25 µm is formed (step S4 in FIG. 6).

Then, the base 39 including the coating film 48 formed thereon is placed on a hot plate, and the coating film 48 is subjected to pre-baking at a temperature of 95° C. With the pre-baking, a solvent in the transparent negative resist is volatilized.

Figure 7D:
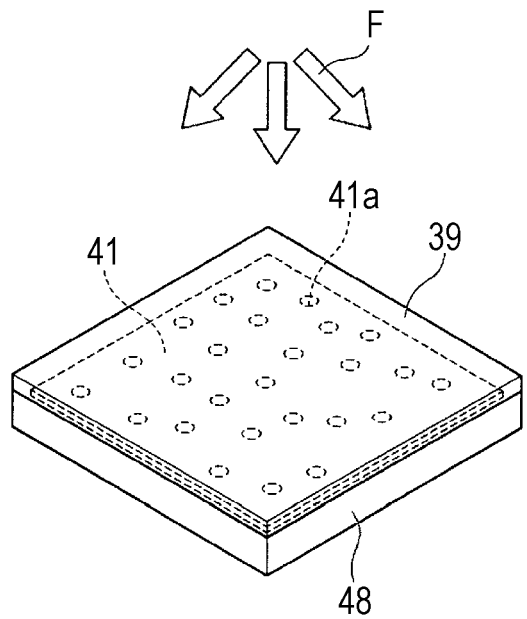
FIG. 7D is a perspective view illustrating a step of manufacturing the viewing-angle widening film according to the first embodiment of the present invention.

Then, as illustrated in FIG. 7D, the base 39 is turned upside down, and the coating film 48 is irradiated and exposed with diffused light F from the side including the base 39 with the black layer 41 used as a mask (step S5 in FIG. 6). At that time, an exposure apparatus using a mixture of the i-line having a wavelength of 365 nm, the h-line having a wavelength of 404 nm, and the g-line having a wavelength of 436 nm is used. An exposure amount is set to 500 mJ/cm$^2$. Additionally, parallel light emitted from the exposure apparatus can be converted to the diffused light F for irradiation to the base, for example, by arranging a diffusion plate with a haze of about 50 in an optical path of the parallel light emitted from the exposure apparatus.

Thereafter, the base 39 including the coating film 48 exposed as described above is placed on a hot plate, and the coating film 48 is subjected to post-exposure baking (PEB) at a temperature of 95° C.

Figure 7E:
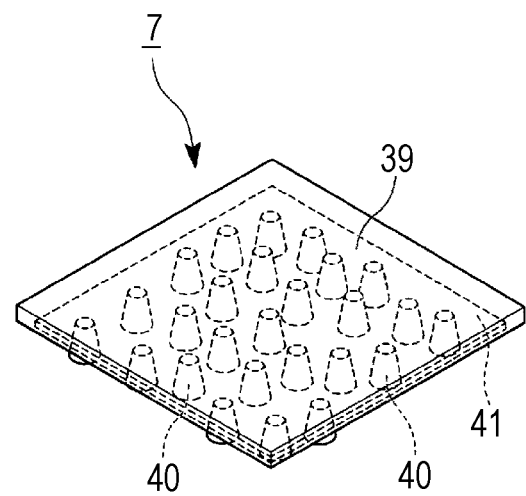
FIG. 7E is a perspective view illustrating a step of manufacturing the viewing-angle widening film according to the first embodiment of the present invention.

Then, the coating film 48 made of the transparent negative resist is developed using a dedicated developing solution and is subjected to post-baking at 100° C., whereby the plural light diffusion portions 40 are formed on the surface of the base 39, as illustrated in FIG. 7E (step S6 in FIG. 6). At that time, at least part of adjacent ones of the plural light diffusion portions 40 are formed in a state where those adjacent light diffusion portions are at least partly connected to each other on the same side as the light-incident end surface 40b through the coupling portions 42 (not illustrated in FIG. 7E). The adjacent light diffusion portions 40 can be coupled to each other, for example, by designing the photomask 45, described above with reference to FIGS. 8A to 8C, such that the light blocking patterns 47 finally becoming the light diffusion portions 40 are positioned in sufficiently close relation. Instead, the adjacent light blocking patterns 47 may be overlapped with each other. As an alternative, exposure conditions, developing conditions, etc. for the coating film 48 made of the transparent negative resist may be adjusted such that the light diffusion portions 40 are appropriately coupled to each other through the coupling portions 42 after the development on the side oppositely away from the base 39.

The viewing-angle widening film 7 according to the first embodiment is completed through the above-described steps S1 to S6 in FIG. 6. A total light transmissivity of the viewing-angle widening film 7 is preferably not less than 90%. At the total light transmissivity being not less than 90%, sufficient transparency is obtained, and optical performance required for the viewing-angle widening film can be sufficiently developed. The total light transmissivity is in conformity with the rule of JIS K7361-1.

While, in the above description, the exposure is performed in the step illustrated in FIG. 7D after turning the base 39 upside down, the base 39 is not always needed to be turned upside down depending on the type of manufacturing apparatus. It is just required that the exposure can be performed from the side including the base 39.

Figure 9:
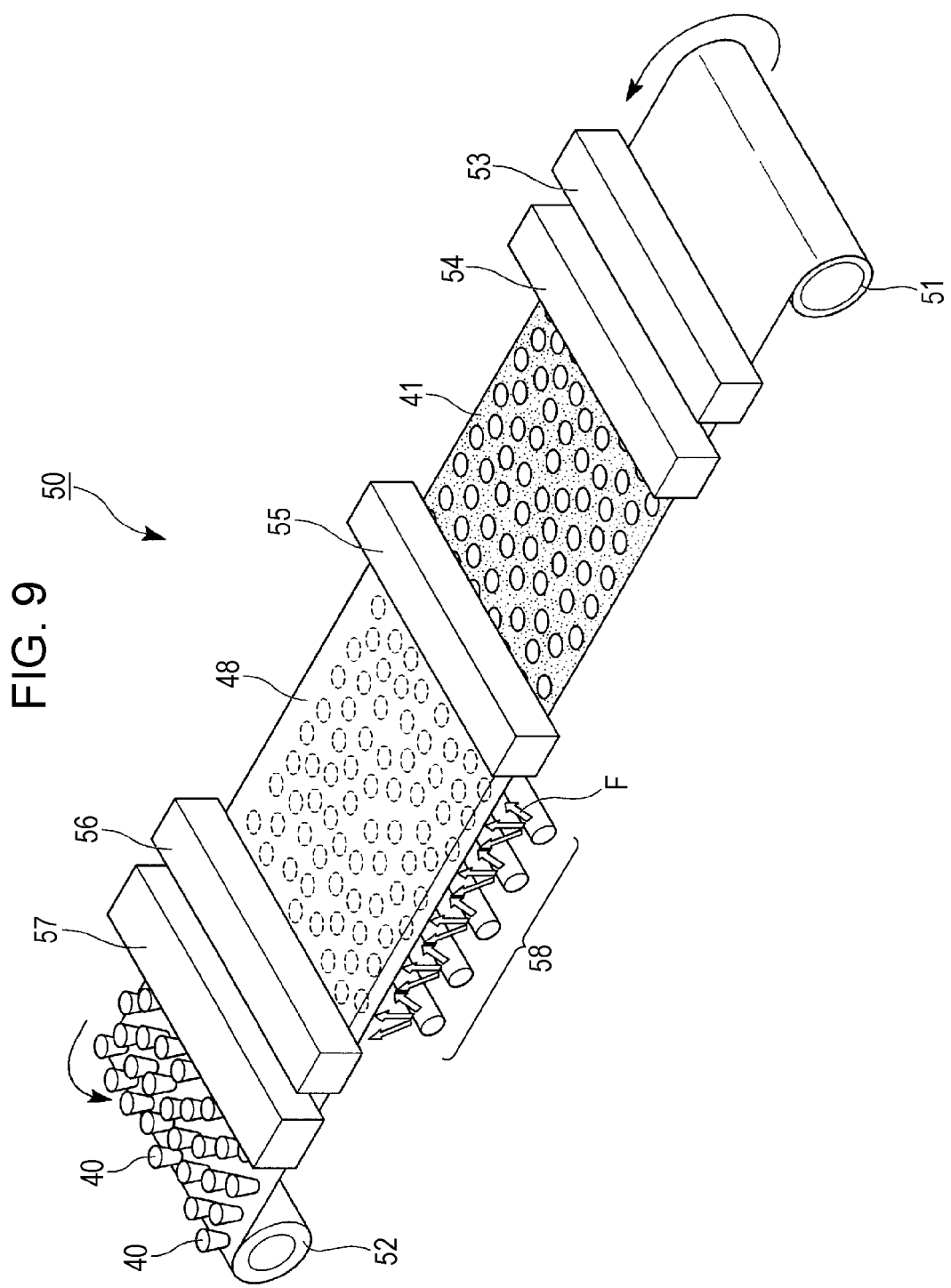
FIG. 9 is a perspective view illustrating one example of an apparatus for manufacturing the viewing-angle widening film according to the first embodiment of the present invention.

FIG. 9 is a schematic perspective view illustrating one example of an apparatus for manufacturing the viewing-angle widening film 7.

A manufacturing device 50, illustrated in FIG. 9, is designed so as to convey the base 39 having a long size in a roll-to-roll manner, and to perform various processes while the base 39 is conveyed. Furthermore, in the manufacturing device 50, the black layer 41 is formed by the printing method instead of the photolithography using the photomask 45 described above.

A let-out roller 51 for letting out the base 39 is disposed at one end of the manufacturing apparatus 50, and a take-up roller 52 for taking up the base 39 is disposed at the other end thereof. The base 39 is moved from the let-out roller 51 toward the take-up roller 52. A printing apparatus 53, a first drying apparatus 54, a coating apparatus 55, a developing apparatus 56, and a second drying apparatus 57 are successively disposed above the base 39 from the side near the let-out roller 51 toward the side near the take-up roller 52. An exposure apparatus 58 is disposed under the base 39. The printing apparatus 53 prints the black layer 41 on the base 39. The first drying apparatus 54 dries the black layer 41 formed by the printing. The coating apparatus 55 coats the transparent negative resist on the black layer 41. The developing apparatus 56 develops the transparent negative resist, after being exposed, by employing a developing solution. The second drying apparatus 57 dries the base 39 on which the light diffusion portions 40 made of the transparent resist after being developed are formed. Thereafter, the base 39 including the light diffusion portions 40 formed thereon may be bonded to the second polarizing plate 5 such that the viewing-angle widening film 7 is integrated with the polarizing plate.

Figure 10A:
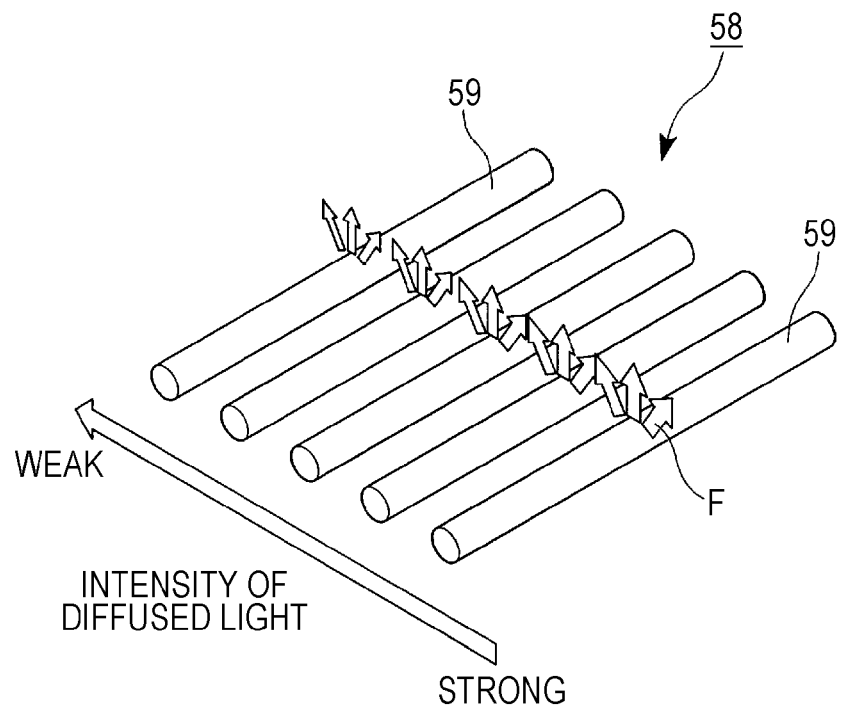
FIG. 10A is a perspective view illustrating principal part of the manufacturing apparatus according to the first embodiment of the present invention.
Figure 10B:
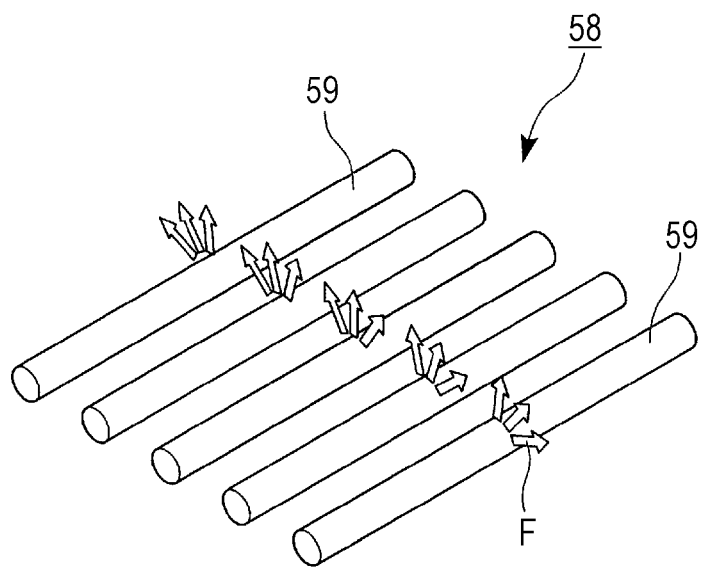
FIG. 10B is a perspective view illustrating principal part of the manufacturing apparatus according to the first embodiment of the present invention.

The exposure apparatus 58 exposes the coating film 48 made of the transparent negative resist from the side including the base 39. FIGS. 10A and 10B illustrate only the exposure apparatus 58 in a state partly extracted from the manufacturing device 50. As illustrated in FIG. 10A, the exposure apparatus 58 includes a plurality of light sources 59. The intensity of diffused light F from the light sources 59 may be changed, for example, such that the intensity of diffused lights F from the light sources 59 is gradually weakened with traveling of the base 39. Alternatively, as illustrated in FIG. 10B, the exposure apparatus 58 may be arranged such that respective emergent angles of the diffused lights F from the light sources 59 are gradually changed with traveling of the base 39. By employing the exposure apparatus 58 described above, the inclination angle of the lateral surface 40c of the light diffusion portion 40 can be controlled to the desired angle.

While, in the above-described example, a liquid resist is coated when the black layer 41 and the light diffusion portion 40 are each formed, a film-like resist may be bonded to the one surface of the base 39 instead of using the liquid resist.

Finally, the completed viewing-angle widening film 7 is bonded, as illustrated in FIG. 2, to the liquid-crystal display main unit 6 using an optical adhesive or the like in a state where the base 39 is positioned to face the viewing side and the light diffusion portions 40 are positioned opposite to the second polarizing plate 5.

The liquid crystal display device 1 according to the first embodiment is completed through the above-described steps.

The viewing-angle widening effect of the viewing-angle widening film 7 in the first embodiment will be described below with reference to FIGS. 11A and 11B.

Figure 11A:
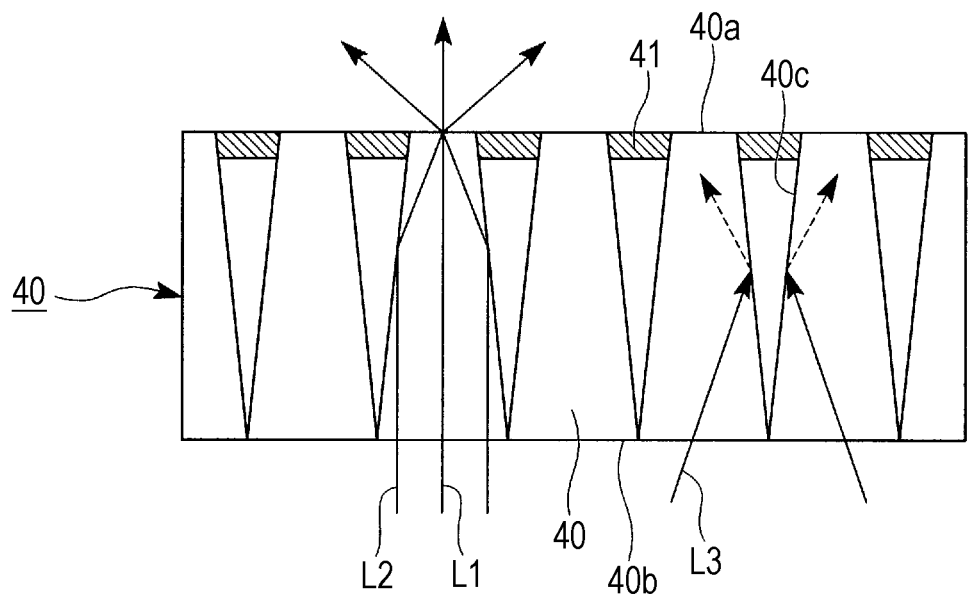
FIG. 11A is an illustration to explain the action of the viewing-angle widening film.
Figure 11B:
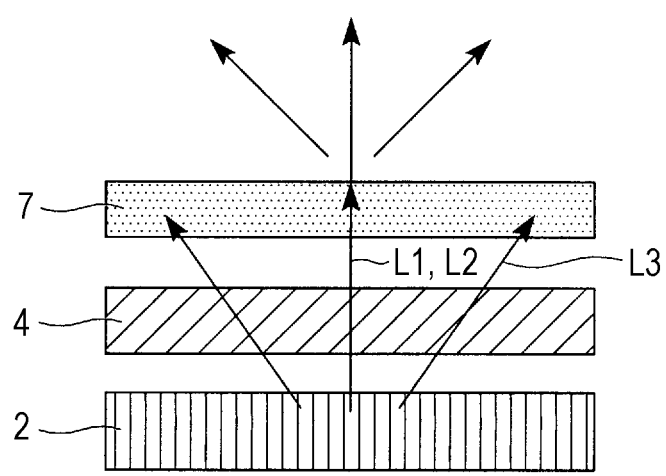
FIG. 11B is an illustration to explain the action of the viewing-angle widening film.

As illustrated in FIG. 11A, of light outgoing from the liquid-crystal display main unit 6 and entering the viewing-angle widening film 7, light L1 substantially vertically entering the light-incident end surface 40b near a center of the light diffusion portion 40 advances straight and transmits through the light diffusion portion 40, as it is, without being totally reflected at the lateral surface 40c of the light diffusion portion 40. Light L2 substantially vertically entering the light-incident end surface 40b in a peripheral edge region of the light diffusion portion 40 hits on the lateral surface 40c of the light diffusion portion at an incident angle larger than the critical angle. Therefore, the light L2 is totally reflected at the lateral surface 40c of the light diffusion portion 40. The totally reflected light is then further refracted at the light-emergent end surface 40a of the light diffusion portion 40 and is output in a direction forming a large angle relative to the direction normal to the light-emergent end surface 40a. On the other hand, light L3 obliquely entering the light-incident end surface 40b of the light diffusion portion 40 hits on the lateral surface 40c of the light diffusion portion 40 at an incident angle smaller than the critical angle. Therefore, the light L3 reflects at the lateral surface 40c of the light diffusion portion 40 and is absorbed by the light absorbing layer 41.

With the action described above, as illustrated in FIG. 11B, the lights L1 and L2 substantially vertically entering the viewing-angle widening film 7 emerges from the viewing-angle widening film 7 in a state having a wider angle distribution than the lights before entering the viewing-angle widening film 7. Accordingly, the observer can see the displayed image with good viewability even when a sight line of the observer is inclined from the front direction (normal direction) of the liquid-crystal display main unit 6. In the first embodiment, particularly, since the light diffusion portion 40 has a circular shape in a plan view, the angle distribution is widened in all directions about, as a center, the direction normal to the screen of the liquid-crystal display main unit 6. Accordingly, the observer can see the displayed image with good viewability in all the directions. Stated another way, the viewing angle of the liquid-crystal display main unit 6 can be widened by employing the viewing-angle widening film 7. On the other hand, the light L3 obliquely entering the viewing-angle widening film 7 corresponds to light having obliquely transmitted through the liquid crystal panel 4. Thus, the light L3 is light with retardation different from a desired value, i.e., light causing a factor to reduce the so-called display contrast. The viewing-angle widening film 7 in the first embodiment can cut the light L3 by the light absorbing layer 41 and can increase the display contrast.

In general, it is known that when regular patters, such as stripes or grids, are stacked one above the other, interference fringes (also called moiré) are visually recognized if periods of the patterns are slightly shifted. For example, when the viewing-angle widening film 7 including the plural light diffusion portions 40 arrayed in the form of a matrix and the liquid crystal panel including the plural pixels arrayed in the form of a matrix are stacked one above the other, there is a possibility that the moiré may occur between a periodic pattern of the light diffusion portions in the viewing-angle widening film and a periodic pattern of the pixels in the liquid crystal panel, thus degrading display quality. In contrast, with the liquid crystal display device 1 according to the first embodiment, since the plural light diffusion portions 40 are arranged at random in a plane, the moiré attributable to interference between the light diffusion portions 40 and the regular array of the pixels in the liquid crystal panel 4 is not generated, and good display quality can be maintained.

Figure 12A:
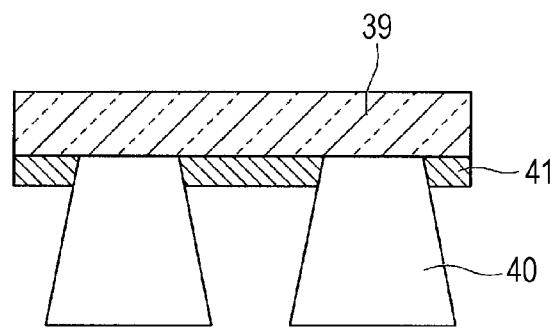
FIG. 12A is an illustration to explain the advantageous effect of the viewing-angle widening film according to the first embodiment of the present invention.
Figure 12B:
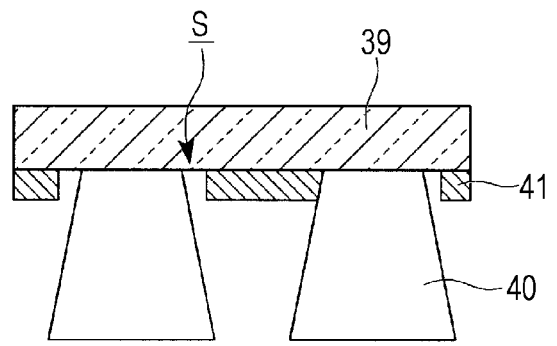
FIG. 12B is an illustration to explain the advantageous effect of the viewing-angle widening film according to the first embodiment of the present invention.

If, in the step of forming the light diffusion portions 40, the light is applied through a photomask from the side including the coating film 48 made of the transparent negative resist, it is very difficult to adjust alignment between the base 39 on which the black layer 41 having very small size openings 41a is formed and the photomask, and misalignment is inevitably caused therebetween. As a result, there is a possibility that a gap S may be generated between the light diffusion portion 40 and the black layer 41 as illustrated in FIG. 12B, and the contrast may be reduced due to leakage of light through the gap S.

In contrast, according to the first embodiment, since the light is applied from the backside of the base 39 with the black layer 41 used as a mask, the light diffusion portions 40 are formed at the positions of the openings 41a in the black layer 41 in a self-aligned state. As a result, the light diffusion portions 40 and the black layer 41 are closely contacted with each other and no gaps are formed between them, whereby good contrast can be reliably maintained.

Furthermore, when the black layer 41 is not formed on the base 39, outside light entering the viewing-angle widening film 7 is also scattered. The scattering of the outside light degrades viewability in a bright place and further causes the so-called "black floating", i.e., a phenomenon that black appears whitish when a black image is displayed. Hence the contrast reduces and the observer cannot see a satisfactory image. The black layer 41 is arranged on the base 39 to prevent the above-mentioned problems.

Moreover, according to the first embodiment, since some of the adjacent light diffusion portions 40 are coupled to each other through the coupling portions 42 and the coupling portions 42 also contribute to introducing the incident light, a ratio of an area of light-incident surfaces to a total area of the viewing-angle widening film 7 is substantially increased. Therefore, the usage efficiency of light can be improved and the light diffusion rate can be increased in the viewing-angle widening film 7. In addition, the adhesive is harder to enter the gaps between the light diffusion portions 40 with the presence of the coupling portions 42, and air is easier to reside in the gaps between the light diffusion portions 40 in coexistence with the adhesive. Accordingly, the range of incident angle at which the light is totally reflected at the lateral surface 40c of the light diffusion portion 40 is widened. As a result, a loss of light can be further suppressed and higher luminance can be obtained.

Since the light diffusion portions 40 are coupled to each other, the advantageous effect from the viewpoint of mechanical strength can also be obtained in addition to the above-described advantageous effect from the optical point of view. In more detail, when the viewing-angle widening film 7 is bonded to the liquid-crystal display main unit 6, the adhesive is harder to enter the gaps between the light diffusion portions 40. This allows the adhesive to be sufficiently filled into a space between the viewing-angle widening film 7 and the liquid-crystal display main unit 6. Hence the viewing-angle widening film 7 and the liquid-crystal display main unit 6 can be firmly fixed to each other. Furthermore, when an external force is applied to the viewing-angle widening film 7, the light diffusion portions 40 are less susceptible to breakage or peeling-off, and reliability of the viewing-angle widening film 7 can be increased.

Figure 13:
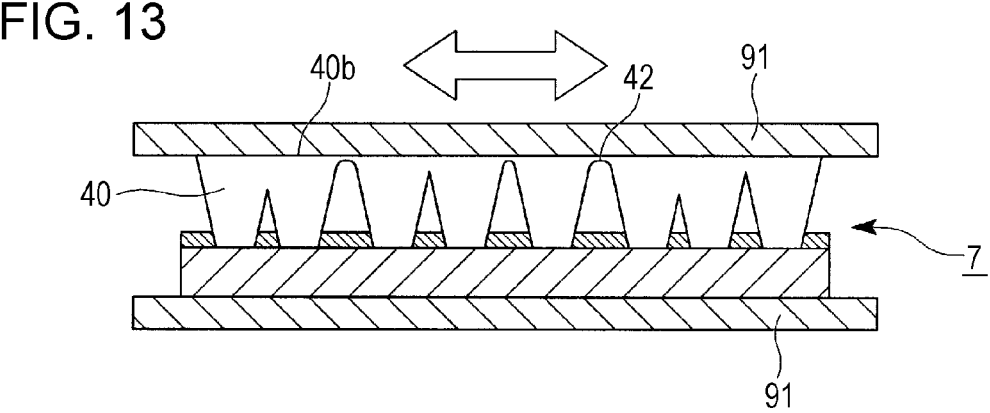
FIG. 13 is an illustration to explain a method of carrying out a strength evaluation test for the viewing-angle widening film according to the first embodiment of the present invention.

The inventors conducted experiments to prove the advantageous effect of the first embodiment, i.e., the effect of increasing the mechanical strength of the viewing-angle widening film 7. As an experimental method, as illustrated in FIG. 13, a shear test was carried out by holding the viewing-angle widening film 7 according to the first embodiment between two stainless plates 91 having smooth surfaces, and by relatively moving the viewing-angle widening film 7 at a speed of 1 cm/sec while applying pressure of $5.0 \times 10^{-3}$ kg/cm² such that uniform pressure was imposed on the entire surface of the viewing-angle widening film 7. In the shear test, external appearances of the light diffusion portions 40 were checked for each of samples in which a ratio of a total area of the coupling portions 42 to a total area of the respective light-incident end surfaces 40b of the light diffusion portions 40 was changed to 10%, 30%, 50%, 80%, and 100%. Furthermore, a sample in which no light diffusion portions 40 were coupled to each other (i.e., the ratio of the total area of the coupling portions 42 to the total area of the respective light-incident end surfaces 40b of the light diffusion portions 40 was 0%) was prepared as Comparative Example, and an external appearance of the comparative example was checked. Table 1, given below, lists the checked results.

TABLE 1

|  | Coupling Portion Ratio | External Appearance | Presence/Absence of Defects |
|---|---|---|---|
| Comparative Example | 0% | X | Light diffusion portions were mostly defective |
| Example 1 | 10% | Δ | Light diffusion portions were partly defective |
| Example 2 | 30% | ○ | No defects |
| Example 3 | 50% | ○ | No defects |
| Example 4 | 80% | ○ | No defects |
| Example 5 | 100% | ○ | No defects |

As listed in Table 1, it was confirmed that the light diffusion portions 40 were mostly defective in the sample of Comparative Example in which no light diffusion portions 40 were coupled to each other. On the other hand, for the sample of Example 1 in which the ratio of the total area of the coupling portions 42 to the total area of the respective light-incident end surfaces 40b of the light diffusion portions 40 was 10%, it was confirmed that the light diffusion portions 40 were partly defective. Defects of the light diffusion portions 40 were not found in the samples of Examples 2 to 5 in which the ratio of the total area of the coupling portions 42 to the total area of the respective light-incident end surfaces 40b of the light diffusion portions 40 was 30% to 100%. Thus, it was proved that the viewing-angle widening film 7 having superior mechanical strength is obtained with the first embodiment.

[Second Embodiment]

A second embodiment of the present invention will be described below with reference to FIGS. 14 to 16B.

A basic structure of a liquid crystal display device according to the second embodiment is the same as that in the first embodiment, and the second embodiment is different from the first embodiment in shapes of light diffusion portions of a viewing-angle widening film. In the second embodiment, therefore, description of the basic structure of the liquid crystal display device is omitted and only the viewing-angle widening film is described.

Figure 14:
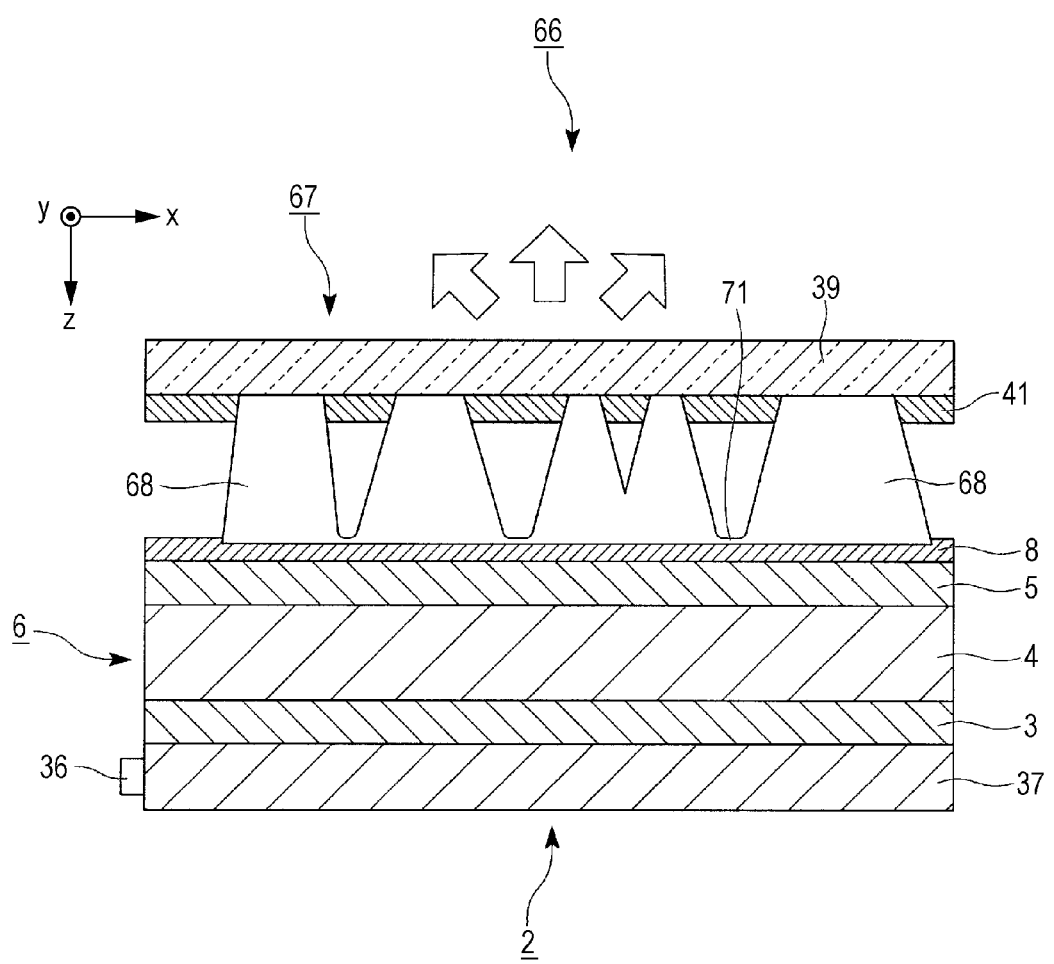
FIG. 14 is a sectional view of a liquid crystal display device according to a second embodiment of the present invention.
Figure 15A:
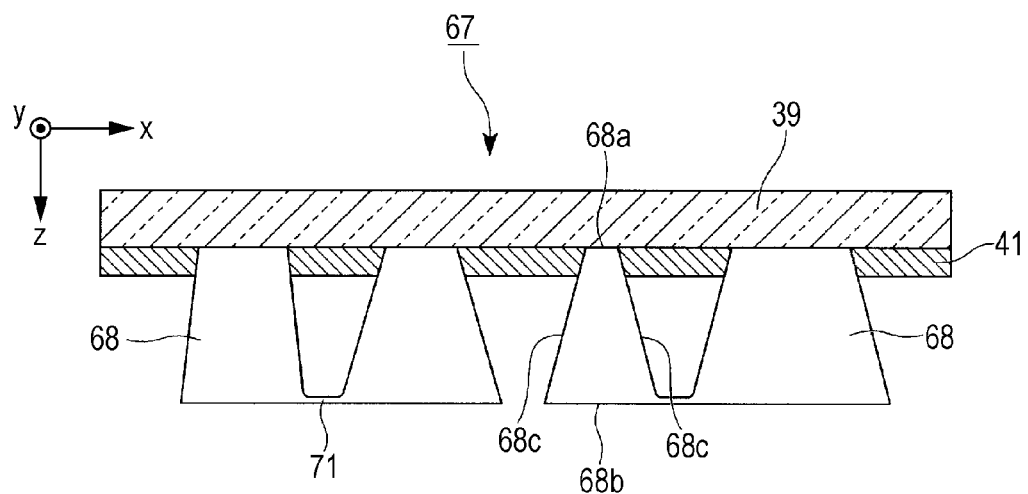
FIG. 15A is a sectional view of a viewing-angle widening film in the liquid crystal display device according to the second embodiment of the present invention.
Figure 15B:
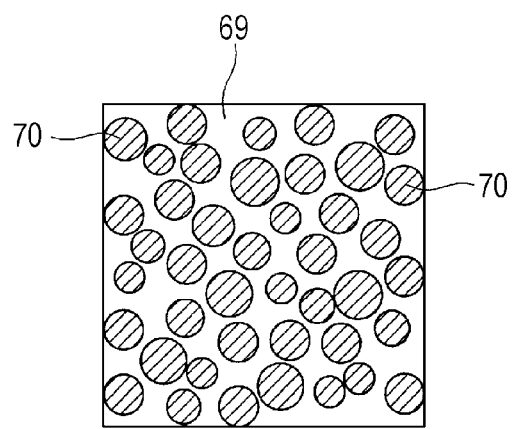
FIG. 15B is a plan view of the phtomask according to the second embodiment of the present invention.
Figure 16A:
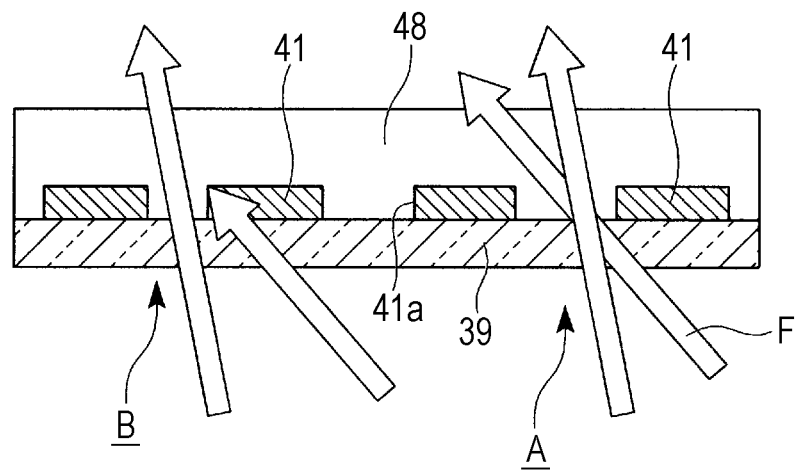
FIG. 16A is an illustration to explain the action of the viewing-angle widening film, which is developed in an exposure step, according to the second embodiment of the present invention.
Figure 16B:
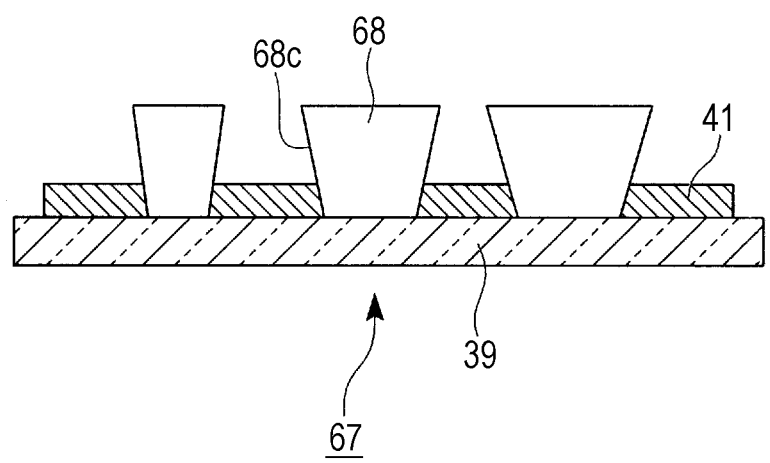
FIG. 16B is an illustration to explain the action of the viewing-angle widening film, which is developed in the exposure step, according to the second embodiment of the present invention.

FIG. 14 is a vertical sectional view of the liquid crystal display device according to the second embodiment. FIG. 15A is a vertical sectional view of the viewing-angle widening film according to the second embodiment. FIG. 15B is a plan view of a photomask that is used in manufacturing the viewing-angle widening film. FIGS. 16A and 16B are illustrations to explain a method of manufacturing the viewing-angle widening film according to the second embodiment.

It is to be noted that, in FIGS. 14 to 16B, constituent elements common to those in the drawings referred to in the first embodiment are denoted by the same signs, and detailed description of those constituent elements is omitted here.

In the first embodiment, all of the plural light diffusion portions have the same shape. In a viewing-angle widening film 67 according to the second embodiment, however, plural light diffusion portions 68 are different in not only sizes of individual light-emergent end surfaces 68a (i.e., sizes of individual openings in the black layer 41), but also in inclination angles of lateral surfaces 68c, as illustrated in FIGS. 14 and 15A. More specifically, looking at the plural light diffusion portions 68 as a whole, the respective light-emergent end surfaces 68a of the light diffusion portions 68 have plural types of sizes, and the respective lateral surfaces 68c of the light diffusion portions 68 have plural types of inclination angles. Furthermore, because the inclination angles of the lateral surface 68c are different among the light diffusion portions 68, light-incident end surfaces 68b have different sizes. In the second embodiment, as in the first embodiment, at least part of the adjacent light diffusion portions 68 are coupled to each other through coupling portions 71 in at least part of regions thereof on the same side as the light-incident end surfaces 68*b*. The other structure of the second embodiment is similar to that of the first embodiment.

As illustrated in FIG. 15B, in a photomask 69 used in forming the black layer 41, a plurality of light blocking patterns 70 have different sizes such that their diameters are distributed in the range of 10 μm to 25 μm. By forming the black layer 41 using the photomask 69, the black layer 41 having different sizes of plural openings is obtained. Thereafter, as illustrated in FIG. 16A, the coating film 48 made of the transparent negative resist is exposed from the side including the base 39 with the black layer 41 used as a mask. At that time, of the diffused light F, the light entering the base 39 at a larger incident angle is less apt to be blocked off by the black layer 41 at a position where the opening 41*a* in the black layer 41 has a larger size, like a position denoted by a sign A in FIG. 16A. At such a position, therefore, the light entering the base 39 at a larger incident angle also contributes to exposure of the coating film 48, and the inclination angle of the lateral surface 68*c* of the light diffusion portion 68 becomes gentler as illustrated in FIG. 16B.

On the other hand, the light entering the base 39 at a larger incident angle is more apt to be blocked off by the black layer 41 at a position where the opening 41*a* in the black layer 41 has a smaller size, like a position denoted by a sign B in FIG. 16A. At such a position, therefore, the light entering the base 39 at a larger incident angle cannot contribute to exposure of the coating film 48, and the inclination angle of the lateral surface 68*c* of the light diffusion portion 68 becomes steeper as illustrated in FIG. 16B. Thus, by making the sizes of the openings 41*a* in the black layer 41 different from each other, it is possible to make different not only the sizes of the light-emergent end surfaces 68*a* of the light diffusion portions 68, but also the inclination angles of the lateral surface 68*c*. As a matter of course, a diffusion angle of the diffused light may be changed depending on positions like the first embodiment.

In the liquid crystal display device 66 according to the second embodiment, similar advantageous effects to those in the first embodiment can also be obtained by providing the viewing-angle widening film with features that display quality can be maintained without generating the moiré, the usage efficiency of light can be increased, and high reliability can be ensured with superior mechanical strength.

As described above in the chapter of [First Embodiment], the light incident on the light diffusion portion is totally reflected at the lateral surface of the light diffusion portion and is output to emerge from the light diffusion portion in a state having a wider angle distribution than the light before entering the light diffusion portion. Accordingly, the angle distribution of the light emerging from the light diffusion portion depends on a distribution of the inclination angle of the lateral surface of the light diffusion portion. For that reason, when the inclination angle of the lateral surface 40*c* of the light diffusion portion 40 is constant as in the first embodiment, luminance is increased at a particular light emergent angle, and the displayed image can be viewed with higher brightness at a particular observing angle. On the other hand, there is a possibility that, when observing the display device at different angles, non-uniformity may be observed in the displayed image depending on the observing angle.

In contrast, according to the structure of the second embodiment, since the lateral surfaces 68*c* of the light diffusion portions 68 have different inclination angles, the range of the total reflection angle for the incident light can be increased with cooperative actions of the plural light diffusion portions 68 having the lateral surfaces 68*c* of different inclination angles. As a result, when observing the liquid crystal display device 66 at different angles, the luminance is moderately changed depending on the viewing angle, and a viewing angle characteristic can be improved.

Furthermore, when trying to arrange the plural light diffusion portions at random by forming the light diffusion portions of the same size, regions where the light diffusion portions cannot be arranged is increased due to the occurrence of interference between the light diffusion portions. In such a case, a proportion of the light diffusion portions occupying in the entire viewing-angle widening film is reduced and, of light emitted from the backlight, a proportion of light absorbed by the black layer without transmitting through the light diffusion portions is increased. As a result, the usage efficiency of the light emitted from the backlight is reduced and the frontal luminance is also reduced. In this respect, according to the second embodiment, the proportion of the light diffusion portions 68 occupying in the entire viewing-angle widening film 67 can be increased, for example, by filling gaps between the light diffusion portions 68 having larger sizes with the light diffusion portions 68 having smaller sizes. It is hence possible to improve the usage efficiency of the light emitted from the backlight, and to increase the frontal luminance.

According to the second embodiment, since the lateral surfaces 68*c* of the light diffusion portions 68 have plural types of inclination angles, the luminance is moderately changed as one advantageous effect. However, the effect of improving the viewing angle characteristic can also be obtained just by setting two types of inclination angles such that the inclination angle of at least part of the light diffusion portions is set different from the inclination angle of the other light diffusion portions.

[Third Embodiment]

A third embodiment of the present invention will be described below with reference to FIGS. 17 and 18.

A basic structure of a liquid crystal display device according to the third embodiment is the same as that in the first embodiment, and the third embodiment is different from the first embodiment in shapes of light diffusion portions of a viewing-angle widening film. In the third embodiment, therefore, description of the basic structure of the liquid crystal display device is omitted and only the viewing-angle widening film is described.

Figure 17:
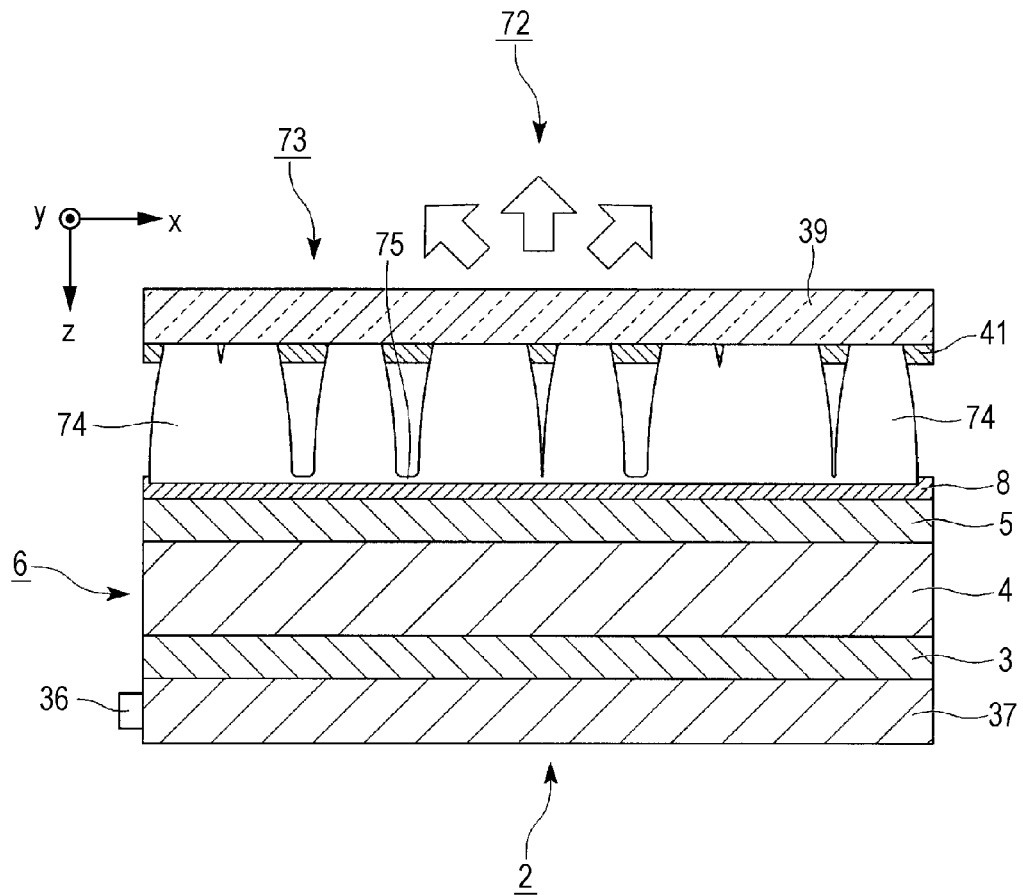
FIG. 17 is a sectional view of a liquid crystal display device according to a third embodiment of the present invention.

FIG. 17 is a vertical sectional view of the liquid crystal display device according to the third embodiment. FIG. 18 is a vertical sectional view of the viewing-angle widening film according to the third embodiment.

Figure 18:
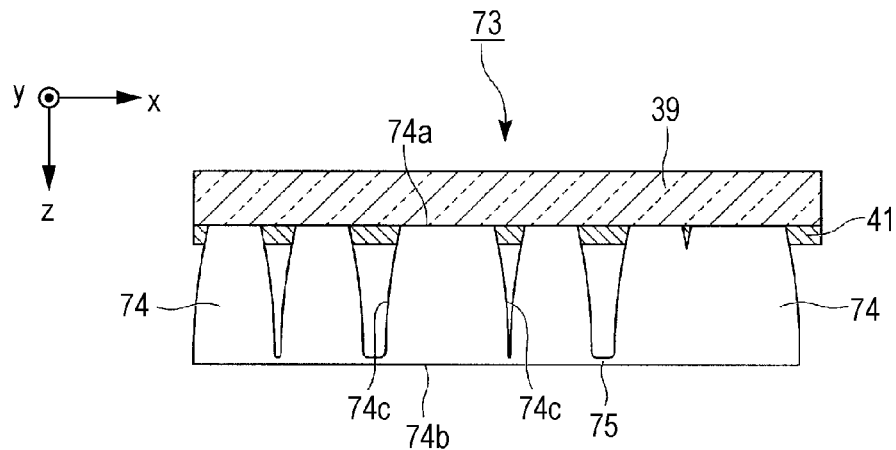
FIG. 18 is illustrates a viewing-angle widening film in the liquid crystal display device according to the third embodiment of the present invention.

It is to be noted that, in FIGS. 17 and 18, constituent elements common to those in the drawings referred to in the first embodiment are denoted by the same signs and detailed description of those constituent elements is omitted here.

In the first and second embodiments described above, when looking at one light diffusion portion, the lateral surface of the light diffusion portion has a constant inclination angle. In contrast, as illustrated in FIGS. 17 and 18, a viewing-angle widening film 73 according to the third embodiment is formed such that a lateral surface 74*c* of each light diffusion portion 74 is moderately curved in the convex form over a region from a light-emergent end surfaces 74*a* to a light-incident end surface 74*b*, and that an inclination angle of the lateral surface 74*c* is different depending on positions in the lateral surface 74*c*. In the third embodiment, as in the first embodiment, at least part of adjacent light diffusion portions 74 are coupled to each other through coupling portions 75 in at least part of regions thereof on the same side as the light-incident end surfaces 74*b*. The other structure of the third embodiment is similar to that of the first embodiment.

In the liquid crystal display device 72 according to the third embodiment, display quality can be similarly maintained without generating the moiré. Moreover, the viewing-angle widening film ensuring high usage efficiency of light and high reliability with superior mechanical strength can be realized. In other words, the third embodiment can also provide similar advantageous effects to those obtained with the first and second embodiments.

Furthermore, in the case where the inclination angle of the lateral surface of the light diffusion portion is constant, non-uniformity of the displayed image may be observed depending on the observing angle when the observing angle is changed in the horizontal direction or the vertical direction of a screen. To cope with such non-uniformity in the displayed image, the lateral surfaces of the light diffusion portions have the plural types of inclination angles in the second embodiment, when looking at the light diffusion portions as a whole. In contrast, in the viewing-angle widening film 73 according to this embodiment, since the inclination angle is different at positions in the lateral surface 74c of each of the light diffusion portions 74, a reflection angle distribution of the light is widened from that in the case where the inclination angle of each lateral surface is constant. As a result, the luminance is moderately changed depending on the observing angle, whereby the viewing angle characteristic can be improved.

[Fourth Embodiment]

A fourth embodiment of the present invention will be described below with reference to FIGS. 19 and 20.

A basic structure of a liquid crystal display device according to the fourth embodiment is the same as that in the first embodiment, and the fourth embodiment is different from the first embodiment in shapes of light diffusion portions of a viewing-angle widening film. In the fourth embodiment, therefore, description of the basic structure of the liquid crystal display device is omitted and only the viewing-angle widening film is described.

Figure 19:
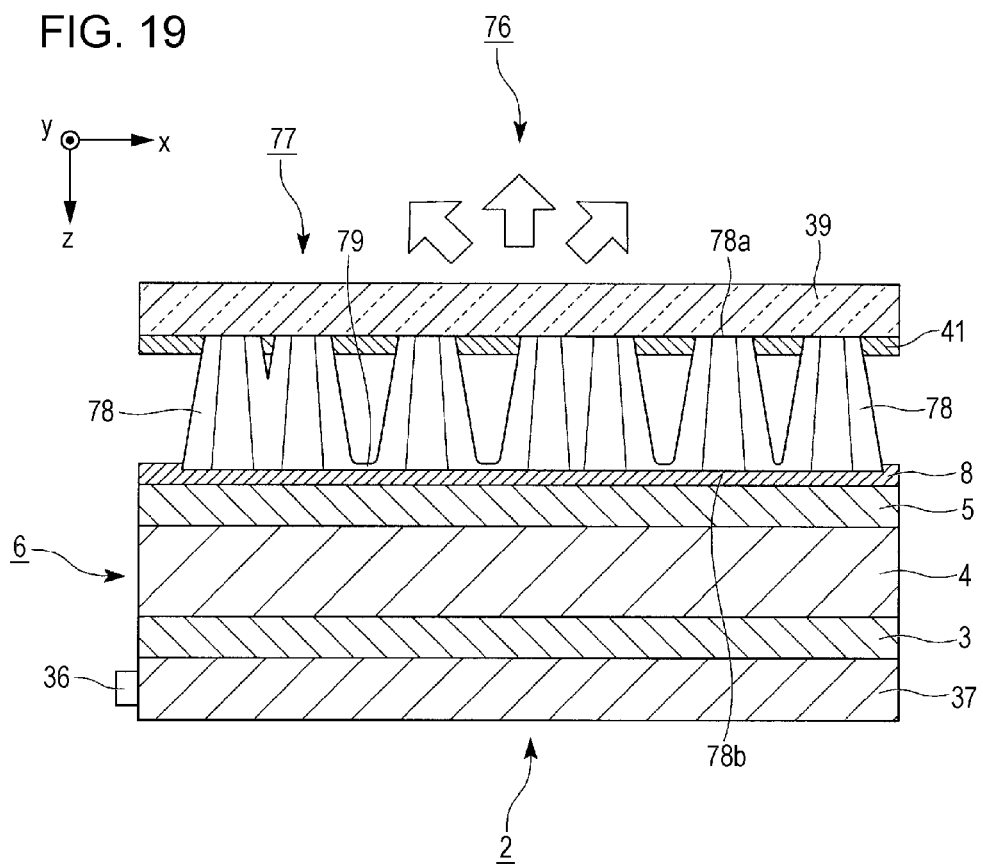
FIG. 19 is a sectional view of a liquid crystal display device according to a fourth embodiment of the present invention.

FIG. 19 is a vertical sectional view of the liquid crystal display device according to the fourth embodiment. FIG. 20 is a plan view of a viewing-angle widening film according to the fourth embodiment.

Figure 20:
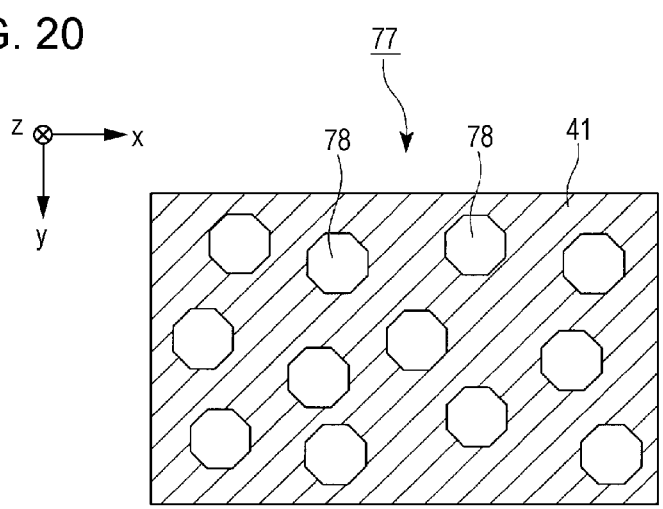
FIG. 20 is illustrates a viewing-angle widening film in the liquid crystal display device according to the fourth embodiment of the present invention.

It is to be noted that, in FIGS. 19 and 20, constituent elements common to those in the drawings referred to in the first embodiment are denoted by the same signs and detailed description of those constituent elements is omitted here.

In the first to third embodiments, each of the light diffusion portions has substantially the truncated conical shape, and the light-incident end surface and the light-emergent end surface of each light diffusion portion have the circular shape in a plan view. On the other hand, in a viewing-angle widening film 77 according to the fourth embodiment, each of the light diffusion portions 78 has an octagonal truncated-pyramidal shape, and a light-incident end surface 78b and a light-emergent end surface 78a of each light diffusion portion 78 have an octagonal shape in a plan view, as illustrated in FIG. 19. Of eight sides of an octagon defining the plan shape of each light diffusion portion 78, four sets of sides, each set being made of two sides parallel to each other, are arranged to extend in a direction parallel to the x-axis, in a direction parallel to the y-axis, in a direction forming an angle of 45° relative to the x-axis (the angle being measured counterclockwise from a reference defined as the positive direction of the x-axis), and in a direction forming an angle of 135° relative to the x-axis. In the fourth embodiment, as in the first embodiment, at least part of adjacent light diffusion portions 78 are coupled to each other through coupling portions 79 in at least part of regions thereof on the same side as the light-incident end surfaces 78b. The other structure of the fourth embodiment is similar to that of the first embodiment. The viewing-angle widening film 77 having the above-described structure can be fabricated by employing a photomask, which has octagonal light blocking patterns, in the step of forming the black layer 41.

In a liquid crystal display device 76 according to the fourth embodiment, similar advantageous effects to those in the first to third embodiments can also be obtained by realizing the viewing-angle widening film with features that display quality can be maintained without generating the moiré, the usage efficiency of light can be increased, and high reliability can be ensured with superior mechanical strength.

Moreover, according to the first to third embodiments, since the light diffusion portions have the circular shape in a plan view, light is diffused in all directions about, as a center, the direction normal to the liquid-crystal display main unit 6, and the viewing-angle widening effect is developed in all the directions. On the other hand, according to the fourth embodiment, since the light diffusion portions 78 have the octagonal shape in a plan view and the above-mentioned four sets of sides of the octagon extend in the direction parallel to the x-axis, the direction parallel to the y-axis, the direction forming an angle of 45° relative to the x-axis, and the direction forming an angle of 135° relative to the x-axis, respectively, light is diffused in those four direction in a concentrated way. Therefore, the viewing-angle widening effect is developed in the horizontal direction, the vertical direction, and the oblique direction of the screen, in which directions the viewing angle characteristic is particularly regarded as important in the liquid crystal display device. Additionally, the shape of the light diffusion portion 78 in a plan view is not limited to the octagon, and it may be some other polygonal shape. In such a case, since light is diffused in particular directions in a concentrated way depending on the polygonal shape and arrangement of sides thereof, a liquid crystal display device can be provided which develops the superior viewing-angle widening effect in particular observing directions.

[Fifth Embodiment]

A fifth embodiment of the present invention will be described below with reference to FIG. 21.

A basic structure of a liquid crystal display device according to the fifth embodiment is the same as that in the first embodiment, and the fifth embodiment is different from the first embodiment in that the former includes a touch panel. In the fifth embodiment, therefore, description of the basic structure of the liquid crystal display device is omitted and only a structure of the touch panel is described.

Figure 21:
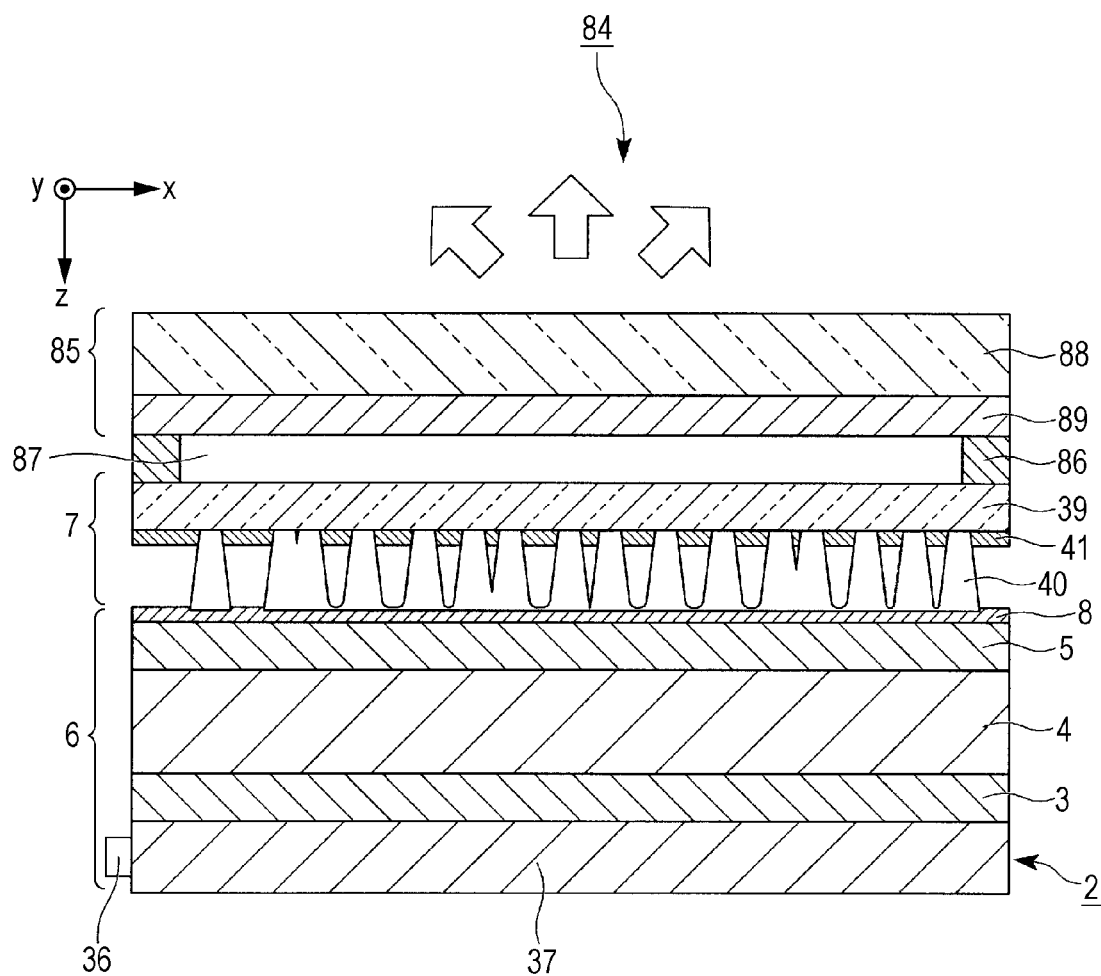
FIG. 21 is a sectional view of a liquid crystal display device according to a fifth embodiment of the present invention.

It is to be noted that, in FIG. 21, constituent elements common to those in FIG. 2 referred to in the first embodiment are denoted by the same signs and detailed description of those constituent elements is omitted here.

In a liquid crystal display device 84 according to the fifth embodiment, as illustrated in FIG. 21, the structure of a section ranging from the backlight 2 to the viewing-angle widening film 7 is the same as that in the first embodiment. A touch panel 85 (information input device) is arranged on the viewing side of the base 39 that constitutes the viewing-angle widening film 7. In the following description, the base 39 constituting the viewing-angle widening film 7 is referred to as a "viewing-angle widening film base". The touch panel 85 is bonded onto the viewing-angle widening film base 39 at peripheral edges of the viewing-angle widening film base 39 using a bonding material 86, such as a double-faced tape, and a gap corresponding to the thickness of the bonding material 86 is formed between the touch panel 85 and the viewing-angle widening film base 39. In other words, an air layer 87 is present between the touch panel 85 and the viewing-angle widening film base 39.

The touch panel 85 includes a base 88 and a position detection electrode 89. In the following description, the base 88 constituting the touch panel 85 is referred to as a "touch panel base". The position detection electrode 89 is made of a transparent conductive material, e.g., ITO or ATO (Antimony-doped Tin Oxide), and is formed on one surface of the touch panel base 88 that is made of, e.g., glass. The position detection electrode 89 is formed by sputtering ITO or ATO, for example, and it has a uniform sheet resistance of about several hundreds to 2 kΩ/.

The touch panel 85 of the capacitance type is used in the fifth embodiment. In the capacitance-type touch panel 85, a minute voltage is applied to, e.g., four corners of the position detection electrode 89 when looking at the touch panel 85 in a plan view from above. When a finger is touched on the position detection electrode 89 at an arbitrary position, a finger-touched point is grounded through the capacitance of a human body. Therefore, the voltages at the four corners are changed depending on resistance values between the grounded point and the four corners. A position detection circuit measures the voltage changes as current changes and detects the grounded position, i.e., the finger touched position, from the measured values.

The touch panel applicable to the fifth embodiment is not limited to the capacitance type, and any desired type of the touch panel, including the resistance film type, the ultrasonic type, and the optical type, can also be applied.

With the liquid crystal display device 84 according to the fifth embodiment, because of including the viewing-angle widening film 7 as in the first embodiment, a liquid crystal display device having the superior viewing angle characteristic and including the information input device can be realized. For example, a user can input information to, e.g., an information processing device in a dialog manner by touching the touch panel 85 with a finger or a pen while looking at an image over a wider range of viewing angle.

It is to be noted that the technical scope of the present invention in practical forms is not limited to that described in the above embodiments, and the above-described embodiments can be variously modified within the scope not departing from the gist of the present invention in practical forms. For example, while the foregoing embodiments have been described in connection with the liquid crystal display device as one example of a display device, applications of the present invention are not limited to the liquid crystal display device. The practical forms of the present invention may be applied to an organic electroluminescence display device, a plasma display, and so on.

Furthermore, while the foregoing embodiments have been described in connection with the example in which the viewing-angle widening film is bonded to the second polarizing plate of the liquid-crystal display main unit, the viewing-angle widening film and the liquid-crystal display main unit are not always required to be contacted with each other.

For example, another optical film, optical member, or the like may be inserted between the viewing-angle widening film and the liquid-crystal display main unit. As an alternative, the viewing-angle widening film and the liquid-crystal display main unit may be arranged at positions spaced from each other. In the case using an organic electroluminescence display device or a plasma display, for example, because a polarizing plate is not needed, the viewing-angle widening film and the polarizing plate are in no way contacted with each other.

At least one of an antireflection layer, a polarizing filter layer, an antistatic layer, an anti-glaring processed layer, and an antifouling processed layer may be disposed on the viewing side of the base of the viewing-angle widening film in the above-described embodiments. With such an arrangement, it is possible to add, e.g., the function of reducing reflection of the outside light, the function of preventing attachment of dust and contaminants, and the function of preventing flaws depending on the type of the layer that is disposed on the viewing side of the base. As a result, degradation of the viewing angle characteristic with the lapse of time can be avoided.

While the foregoing embodiments have been described above as arranging the plural light diffusion portions at random, the light diffusion portions are not always required to be arranged at random. When the light diffusion portions are aperiodically arranged, the occurrence of moiré can be suppressed. Furthermore, if the occurrence of moiré is allowed to some extent depending on situations and usages, the light diffusion portions may be periodically arranged. In any cases including such a case, however, it is required that at least part of the adjacent light diffusion portions are coupled to each other through the coupling portions in at least part of regions thereof on the same side as the light-incident end surfaces. For example, the light diffusion portions may be arranged in a matrix form over the entire viewing-angle widening film. In that case, by coupling, of the plural light diffusion portions, those light diffusion portions arrayed in a first direction to each other, and not coupling those light diffusion portions arrayed in a second direction orthogonal to the first direction, for example, a viewing-angle widening film having high durability against shear stress in the first direction can be realized.

Moreover, while the light diffusion portion has the truncated conical shape or the truncated polygonal-pyramidal shape in the above-described embodiments, the inclination angle of the lateral surface of the light diffusion portion is not always required to be symmetric with respect to the optical axis as a center. When the light diffusion portion has the truncated conical shape or the truncated polygonal-pyramidal shape as in the above-described embodiments, the inclination angle of the lateral surface of the light diffusion portion is symmetric with respect to the optical axis as a center, and hence a symmetric angle distribution is obtained with respect to the optical axis as a center. On the other hand, when an asymmetric angle distribution is intentionally required depending on use or usage of the display device, for example, when there is a demand for widening the viewing angle only toward the upper side or the right side of the screen, the inclination angle of the lateral surface of the light diffusion portion may be set to be asymmetric.

In addition, the details regarding the arrangements and the shapes of the light diffusion portions and the light absorbing layer, the dimensions and the materials of various components of the viewing-angle widening film, the manufacturing conditions in the manufacturing process, and so on are not limited to those described in the foregoing embodiments and can be modified as required.

INDUSTRIAL APPLICABILITY

The practical forms of the present invention can be applied to various types of display devices, e.g., a liquid crystal display device, an organic electroluminescence display device, and a plasma display.

REFERENCE SIGNS LIST

1, 66, 72, 76, 80, 84 . . . liquid crystal display device (display device), 6 . . . liquid-crystal display main unit (display main unit), 7, 62, 67, 73, 77, 81 . . . viewing-angle widening film (viewing-angle widening member), 8 . . . adhesive layer, 39 . . . base, 40, 68, 74, 78, 82 . . . light diffusion portion, 40a, 63a, 68a, 74a, 78a, 82a . . . light-emergent end surface, 40b, 63b, 68b, 74b, 78b, 82b . . . light-incident end surface, 40c, 68c, 74c, 78c, 82c . . . lateral surface, 41 . . . black layer (light absorbing layer), 42, 71, 75, 79 . . . coupling portion, 43 . . . air, and 85 . . . touch panel (information input device).

The invention claimed is:

1. A method of manufacturing a light diffusion member, the method comprising:
    forming a light absorbing layer, which includes openings, on one surface of a light-transmissive base;
    forming a negative photosensitive resin layer, which is light-transmissive, on the one surface of the light-transmissive base, the negative photosensitive resin layer covering the light absorbing layer;
    applying diffused light to the negative photosensitive resin layer through the openings in the light absorbing layer from an opposite surface of the light-transmissive base, the opposite surface being opposite to the one surface of the light-transmissive base, the light absorbing layer and the negative photosensitive resin layer being formed above the one surface of the light-transmissive base; and
    developing the negative photosensitive resin layer after being irradiated with the diffused light, the developing being performed to form, on the one surface of the light-transmissive base, a plurality of light diffusion portions each including a light-emergent end surface and a light-incident end surface, the light-emergent end surface being positioned at a first side, the first side being close to the light-transmissive base, the light-incident end surface being positioned at a second side, the second side being spaced away from the light-transmissive base, the light-incident end surface having a larger area than the light-emergent end surface, the light diffusion portions being in a state that at least a portion of adjacent ones of the light diffusion portions are coupled to each other in at least a portion of regions of the light diffusion portions, the at least a portion of regions of the light diffusion portions being positioned at the second side.

\* \* \* \* \*